United States Patent
Li et al.

(10) Patent No.: US 11,914,260 B2
(45) Date of Patent: Feb. 27, 2024

(54) VANADIUM OXIDE WITH A FORMULA OF $VO_x$ AS CHARGE BALANCING MATERIAL FOR ELECTROCHROMIC DEVICES

(71) Applicant: AMBILIGHT INC., Milpitas, CA (US)

(72) Inventors: Xuefei Li, West Lafayette, IN (US); Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 580 days.

(21) Appl. No.: 17/166,617

(22) Filed: Feb. 3, 2021

(65) Prior Publication Data

US 2022/0066276 A1 Mar. 3, 2022

Related U.S. Application Data

(63) Continuation of application No. PCT/US2020/048032, filed on Aug. 26, 2020.

(51) Int. Cl.
*G02F 1/1524* (2019.01)
*C01G 31/02* (2006.01)
(Continued)

(52) U.S. Cl.
CPC .......... *G02F 1/1524* (2019.01); *C01G 31/02* (2013.01); *G02F 1/155* (2013.01); *G02F 1/163* (2013.01); *B82Y 10/00* (2013.01); *B82Y 40/00* (2013.01); *C01P 2004/64* (2013.01); *C01P 2006/14* (2013.01); *C01P 2006/40* (2013.01);
(Continued)

(58) Field of Classification Search
CPC ........ G02F 1/1524; G02F 1/155; G02F 1/163; G02F 2001/15145; G02F 2001/1555; G02F 2001/1635; G02F 2202/022; G02F 2202/36; C01G 31/02; B82Y 10/00; B82Y 40/00;
(Continued)

(56) References Cited

U.S. PATENT DOCUMENTS

| 5,130,841 A | 7/1992 | Demiryont |
| 2016/0026055 A1* | 1/2016 | Choi ..................... B05D 1/005 427/126.3 |

(Continued)

OTHER PUBLICATIONS

International Search Report and Written Opinion for Application No. PCT/US2020/048032, dated Jan. 12, 2021, 9 pages.

*Primary Examiner* — Collin X Beatty

(57) ABSTRACT

An electrochromic device includes a charge balancing thin film comprised of a new vanadium oxide with a formula of $VO_x$, which provides a high charge density, low coloration efficiency, an electroactive voltage in close proximity to those of some electrochromic materials, and high chemical and electrochromic stability. Vanadium oxide can be without doping or doped with others. The $VO_x$ charge balancing thin film has a porous nanostructure and is amorphous or a combination of amorphous and polycrystalline, and can work with electrochromic conjugated polymer in the device in a minimally color changing mode. A method to design a material for a charge balancing thin film to pair with a working electrode and obtain a low device voltage in an electrochromic device is disclosed. Methods to prepare related charge balancing thin films are also disclosed.

19 Claims, 33 Drawing Sheets

(51) Int. Cl.
  *G02F 1/155*   (2006.01)
  *G02F 1/163*   (2006.01)
  *B82Y 10/00*   (2011.01)
  *B82Y 40/00*   (2011.01)
  *G02F 1/1514*  (2019.01)

(52) U.S. Cl.
  CPC .............. *G02F 2001/1555* (2013.01); *G02F 2001/15145* (2019.01); *G02F 2001/1635* (2013.01); *G02F 2202/022* (2013.01); *G02F 2202/36* (2013.01)

(58) Field of Classification Search
  CPC .............. C01P 2004/64; C01P 2006/14; C01P 2006/40; C01P 2004/04
  See application file for complete search history.

(56) References Cited

U.S. PATENT DOCUMENTS

| | | |
|---|---|---|
| 2018/0164650 A1 | 6/2018 | Garcia et al. |
| 2018/0175313 A1 | 6/2018 | Loo et al. |
| 2019/0040526 A1 | 2/2019 | Taha et al. |
| 2020/0024510 A1 | 1/2020 | Zhou |
| 2020/0165161 A1 | 5/2020 | Berlinguette et al. |

* cited by examiner

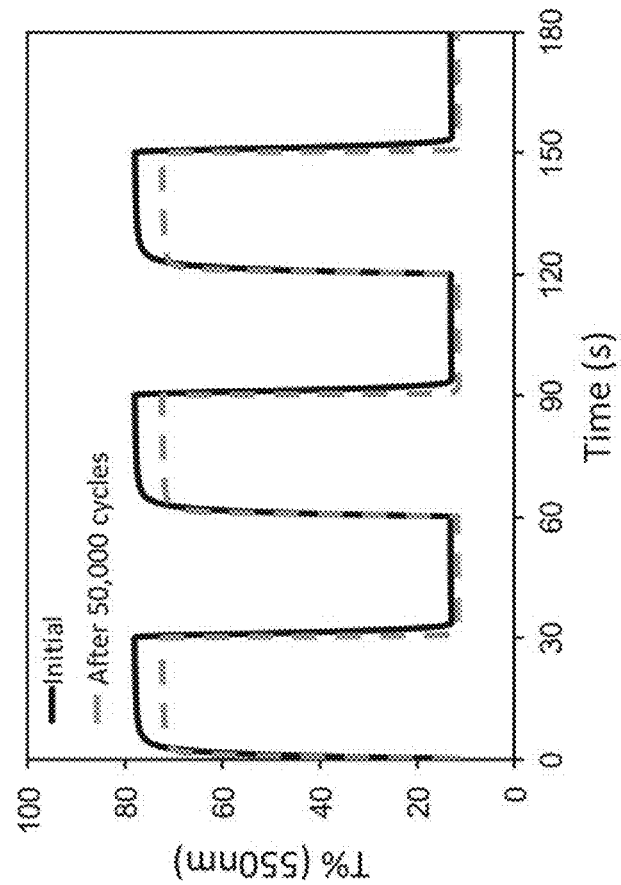
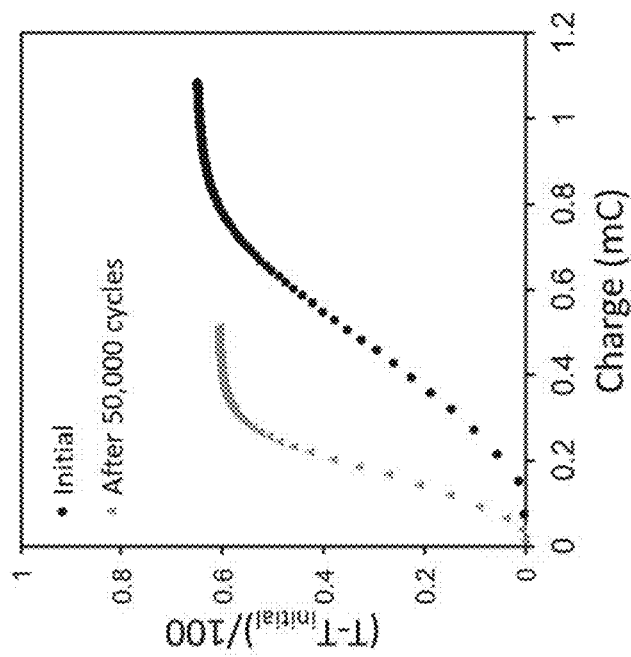
FIG. 12 (A)
FIG. 12 (B)

VANADIUM OXIDE WITH A FORMULA OF VO$_x$ AS CHARGE BALANCING MATERIAL FOR ELECTROCHROMIC DEVICES

CROSS REFERENCE TO RELATED APPLICATIONS

This is a continuation application of International Application No. PCT/US2020/048032, filed on Aug. 26, 2020. The contents of the above-referenced application is incorporated herein by reference in its entirety.

TECHNICAL FIELD

The present disclosure generally relates to the field of electrochromic devices. In particular, the present disclosure is directed to a new composition of vanadium oxide with a formula of VO$_x$ as a charge balancing material for electrochromic devices, electrochromic devices made therewith, and methods to prepare thereof.

BACKGROUND

High performance solid state electrochromic devices (ECDs) require ion storage materials as a charge balancing component. The capacity and stability of the ion storage materials are key factors that influence the optical performance and switching stability of the ECDs. In addition, it is a unique requirement that the ion storage materials should exhibit high optical transmissivity to ensure the crystal-clear appearance of the window-type ECD in the bleached state. The inherent difficulty of making ion storage materials functional and transmissive at the same time presents a major bottleneck for the solid state ECDs.

SUMMARY

Described herein is an electrochromic device, specifically speaking, an electrochromic device comprising a charge balancing thin film including a new composition of vanadium oxide with a formula of VO$_x$ and related thin film preparation methods.

The disclosed vanadium oxide for the charge balancing thin film has a formula of VO$_x$, wherein x ranges from 2 to 2.5. The coloration efficiency of the charge balancing thin film is less than about 10 cm$^2$ and the charge density of the charge balancing thin film is greater than about 2 mC/cm$^2$ at a maximum device working voltage. The disclosed vanadium oxide thin film has a porous nanostructure and is amorphous or a combination of amorphous and polycrystalline. The disclosed vanadium oxide charge balancing thin film can operate in a minimally color changing mode.

The disclosed vanadium oxide can also be a doped VO$_x$ or a doped VO$_x$ hydrate. In some embodiments, the dopants can include any one of the following: the second to fourth period metal cations on the periodic table, such as Li$^+$, Be$^{2+}$, Na$^+$, Me$^+$, Al$^{3+}$, Ca$^{2+}$, Sc$^{3+}$, Ti$^{4+}$, Cr$^{2+}$, Cr$^{3+}$, Mn$^{2+}$, Mn$^{3+}$, Mn$^{4+}$, Fe$^{2+}$, Fe$^{3+}$, Co$^{3+}$, Ni$^{2+}$, Ni$^{3+}$, Zn$^{2+}$, Cu$^{2+}$, Ga$^{3+}$, Ge$^{2+}$; some of the fifth period transition metal cations on the periodic table, such as Nb$^{5+}$, Nb$^{6+}$, Mo$^{5+}$, Mo$^{6+}$; small non-metal cations with diameter less than 0.826 nm, such as NH$_4^+$, tetramethylammonium, tetraethylammonium, and tetrabutylammonium.

The disclosed VO$_x$ based charge balancing material for a counter electrode in ECDs can work with any electrochromic working electrode. Because of low device voltage resulting from close electroactive voltage between the disclosed VO$_x$ based charge balancing material and the working electrode, ECP or WO$_3$ particularly works as a great paring working electrode with the disclosed VO$_x$ material in ECD.

This disclosure also presents a design method to select a material for a charge balancing thin film to pair with a working electrode and obtain a low device voltage in an electrochromic device. The method is to design the material that has an electroactive voltage in close proximity with an electroactive voltage from the working electrode, so that the electrochromic device can operate in a low device voltage.

In another aspect, this disclosure presents a method to make the VO$_x$ charge balancing thin film. The method comprises: preparing a suspension containing VO$_2$ nanostructures by adding a soluble vanadium salt solution into a ZnO nanoparticle suspension to form a VO$_2$ nanostructure suspension; performing a first oxidation step to transform a portion of V$^{4+}$ in the VO$_2$ nanostructure suspension to V$^{5+}$ with the presence of a V$^{5+}$ precursor to form a VO$_x$ suspension; centrifuging the VO$_x$ suspension to obtain a resulting sediment and re-dispersing the resulting sediment in a neutral polar solvent to form a VO$_x$ solution; and preparing a VO$_x$ thin film by a coating method with the VO$_x$ solution.

In some embodiments, the method to make the VO$_x$ charge balancing thin film further comprises a dopant together with the soluble vanadium salt solution to prepare a doped VO$_2$ nanostructure suspension in the first step.

In some embodiments, the method to make the VO$_x$ charge balancing thin film further comprises a pH adjusting step to the soluble vanadium salt solution before being added to the ZnO nanoparticle suspension in the first step to facilitate the conversion of ZnO nanoparticle to VO$_2$ nanostructure and to obtain a homogeneous VO$_2$ nanostructure suspension.

In some embodiments, the method to make the VO$_x$ charge balancing thin film further comprises a second oxidation step to further oxidize V$^{4+}$ to V$^{5+}$ after preparing the VO$_x$ thin film.

In some embodiments, example soluble vanadium salts include VOSO$_4$.

In some embodiments, the reactive V$^{5+}$ precursor comprises vanadium based organo-metallic compounds including vanadium (V) oxytriisopropoxide (VOTP), vanadium (V) oxytriethoxide and vanadium (V) oxytripropoxide.

In some embodiments, the first oxidation method to produce a partially oxidized VO$_x$ comprises hydrothermal synthesis, chemical oxidation and photonic curing.

In some embodiments, the neutral polar solvent for re-dispersion comprises water, methanol, ethanol, acetonitrile, dimethylsulfoxide (DMSO), t-butyl alcohol and acetone.

In some embodiments, the second oxidation method comprises thermal annealing, UV-ozone, photonic curing.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings below.

FIGS. 1(A)-(B) are schematic diagrams showing the electrochromic device oxidation voltage controlled by the electroactive voltages between ECP (at working electrode, WE) and the charge balancing materials (at counter electrode, CE).

FIGS. 2(A)-(B) contain the characterization data for the $VO_x$ nanoparticles. FIG. 2 (B) is a high resolution TEM (HRTEM) image of the as-synthesized $VO_x$ particles.

FIGS. 3(A)-(B) contain the characterization data for the $VO_x$ thin films after UV-Ozone processing. FIG. 3(A) is SEM image of the $VO_x$ thin film.

FIG. 4(A) is $VO_x$ solution dispersed in isopropanol. FIG. 4(B) is $VO_x$ thin film coated on a ITO/glass substrate.

FIG. 5(A) is before UV-Ozone processing. FIG. 5(B) is after UV-Ozone processing.

FIGS. 6(A)-(D) contain the electrochemical and spectroelectrochemical characterization data of the $VO_x$ thin films in a three-electrode configuration, with $VO_x$ thin film on a indium tin oxide (ITO) substrate as the working electrode, Ag/AgCl as the reference electrode and Pt wire as the counter electrode, and 0.2M LiTFSI/PC as electrolyte. FIG. 6 (B) is UV-vis spectra of the $VO_x$ thin film within the same voltage range, with 0.2V voltage increment. FIG. 6 (C) is a diagram illustrating CIELAB color space of the $VO_x$ thin film within the same voltage range and FIG. 6 (D) is a diagram illustrating transmittance (550 nm) changes as a function of charge density of the $VO_x$ thin film.

FIGS. 7(A)-(D) contain the electrochemical and spectroelectrochemical characterization data of the $VO_x$ thin film characterized after 2,500 CV cycles in the same three-electrode configuration as FIG. 6. FIG. 7 (B) is UV-vis spectra of the cycled $VO_x$ thin film within the same voltage range, with 0.2V voltage increment. FIG. 7 (C) is a diagram illustrating CIELAB color space of the cycled $VO_x$ thin film within the same voltage range and FIG. 7 (D) is a diagram illustrating transmittance (550 nm) changes as a function of charge density of the $VO_x$ thin film.

FIGS. 8(A)-(D) contain the electrochemical and spectroelectrochemical characterization data of the $Li^+$ doped $VO_x$ thin films in a three-electrode configuration, with $Li^+$ doped $VO_x$ thin film on a ITO substrate as the working electrode, Ag/AgCl as the reference electrode and Pt wire as the counter electrode, and 0.2M LiTFSI/PC as electrolyte. FIG. 8 (B) is UV-vis spectra of the $Li^+$ doped $VO_x$ thin film within the same voltage range, with 0.2V voltage increment. FIG. 8 (C) is a diagram illustrating CIELAB color space of the $Li^+$ doped $VO_x$ thin film within the same voltage range. FIG. 8 (D) is a diagram illustrating transmittance (550 nm) changes as a function of charge density of the $Li^+$ doped $VO_x$ thin film.

FIGS. 9(A)-(D) contain the electrochemical and spectroelectrochemical characterization data of the $Li^+$ doped $VO_x$ thin films characterized after 2,500 CV cycles in the same three-electrode configuration as the one in FIG. 8. FIG. 9 (B) is UV-vis spectra of the cycled $Li^+$ doped $VO_x$ thin film within the same voltage range, with 0.2V voltage increment. FIG. 9 (C) is a diagram illustrating CIELAB color space of the cycled $Li^+$ doped $VO_x$ thin film within the same voltage range. FIG. 9 (D) is a diagram illustrating transmittance (550 nm) changes as a function of charge density of the cycled $Li^+$ doped $VO_x$ thin film.

FIG. 10(A) is the ECD in a colored state. FIG. 10(B) is the ECD in a bleached state.

FIGS. 11(A)-(D) contain the performance data of the same ECD as the one in FIG. 10. FIG. 11 (B) is UV-Vis spectra of the device as a function of varying voltages at 0.2V increment. FIG. 11 (C) is a diagram illustrating CIELAB color space of the device at different voltages and FIG. 11 (D) is a diagram illustrating transmittance (550 nm) changes as a function of charge density of $VO_x$ thin film.

FIGS. 12(A)-(B) contain the performance data of the same ECD as the one in FIG. 10 in the initial state and after 50,000 cycles. FIG. 12(A) is a diagram illustrating transmittance (550 nm) changes as a function of charge density. FIG. 12(B) is a diagram illustrating the switching kinetics.

FIG. 13 (A) is CV data of the ECP magenta-$VO_x$ devices after electrochemical break-in processes. FIG. 13 (B) is UV-Vis spectra of the device as a function of varying voltages at 0.2V increment. FIG. 13 (C) is a diagram illustrating CIELAB color space of the device at different voltages and FIG. 13 (D) is a diagram illustrating transmittance (550 nm) changes as a function of charge density of $Li^+$ doped $VO_x$ thin film.

FIGS. 14(A)-(B) contain the performance data of the same ECD as the one in FIG. 13 in the initial state and after 75,000 cycles. FIG. 14 (B) is a diagram illustrating switching kinetics.

DETAILED DESCRIPTION OF EMBODIMENTS

Figure 1:
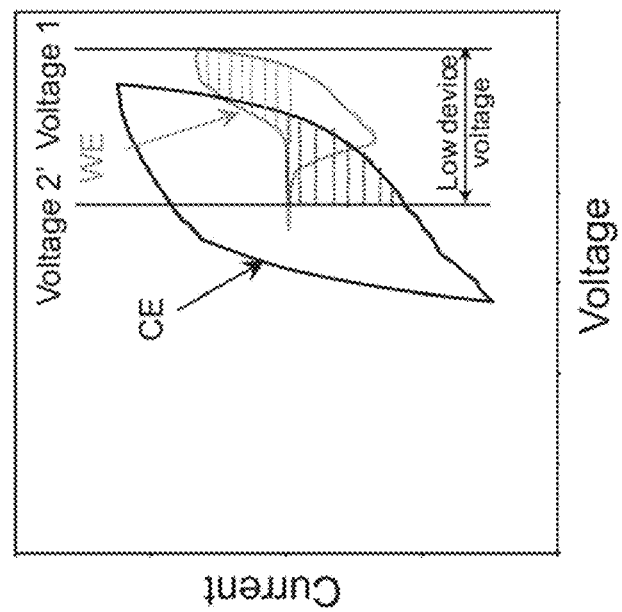
FIG. 1 (A) is the representative scheme showing high device voltage configuration using ECP and conventional metal oxide counter electrode materials (e.g. $Nb_2O_5$) and FIG. 1 (B) is the representative scheme showing low device voltage configuration constructed from ECP and ion storage materials that exhibit closer electroactive voltage to the ECP, e.g. the disclosed $VO_x$ charge balancing material.
Figure 1:
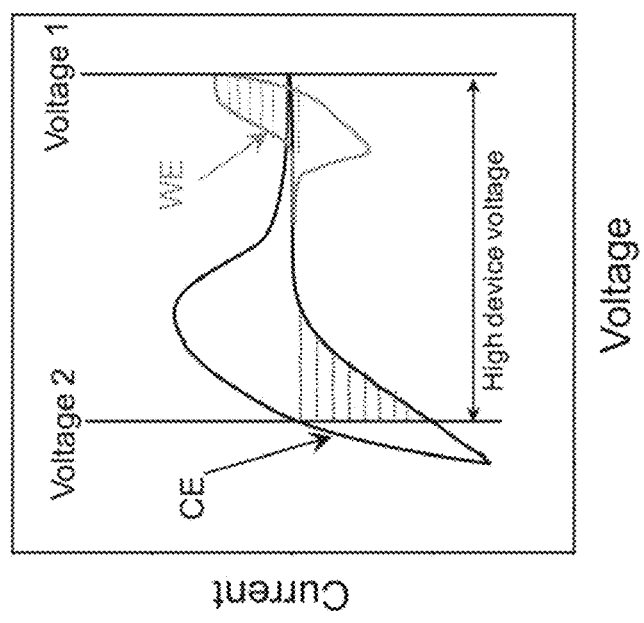

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it are individually recited herein. Additionally, the singular forms "a," "an" and "the" include plural referents unless the context clearly dictates otherwise. In the present disclosure the term "about" can allow for a degree of variability in a value or range, for example, within 10%, within 5%, or within 1% of a stated value or of a stated limit of a range.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

As used herein and in the appended claims, and as known in the art, the term "coloration efficiency", and like terms, is defined as the relationship between the injected/ejected charge per unit area as a function of the change in optical density. It is noted that the term "coloration efficiency" covers one, the other, or both, of the visible spectrum and the infrared (IR) spectrum, depending on the application of the ECD at issue. The term "minimally color changing (MCC) mode" means that when the electrochromic device is operating, the electrochromic layer operates in a full-charge regime while the charge balancing layer operates in an intermediate-charge regime.

The present disclosure relate to an electrochromic device, specifically speaking, an electrochromic device comprising a charge balancing thin film including a new composition of vanadium oxide with a formula of $VO_x$ and related thin film preparation methods.

To develop ion storage materials that are charge balancing and transmissive, several categories of materials have been reported, and a particularly promising candidate is the minimally color changing (MCC) materials. Reported polymer based MCC materials (MCCP) are essentially "bad" electrochromic materials, with intrinsically high transparency and low coloration efficiency. Due to relatively high coloration efficiency, a different design mechanism should be applied to delicately transform conventional transition metal oxide materials (i.e. amorphous $WO_3$ and $Nb_2O_5$), which are intrinsically good electrochromic materials, to manifest minimal color change. An unbalanced charge density ratio commonly adjusted by thickness between the ion storage materials and the electrochromic materials ensures the transitional metal oxide ion storage materials to be electrochemically partially switched, rendering small color changing magnitude in these traditionally good electrochromic materials. Although transition metal oxide MCC materials have advantageous in synthetic availability and processing feasibility, they suffer from their electroactive voltages which are typically far separated from the working electrode's electroactive voltage. This limitation, in turn, leads to high device voltage that induces stability issues including polymer over-oxidation and electrolyte decomposition.

Therefore, it is highly desired to find a charge balancing material which can exhibit not only high charge density and low coloration efficiency, but also an electroactive voltage in close proximity to that of the electrochromic working electrode.

The disclosed vanadium oxide for the charge balancing thin film has a formula of $VO_x$, wherein x ranges from 2 to 2.5. The coloration efficiency of the charge balancing thin film is less than about 10 $cm^2\ C^{-1}$ and the charge density of the charge balancing thin film is greater than about 2 $mC/cm^2$ at a maximum device working voltage.

In some embodiments, the coloration efficiency of the charge balancing thin film is equal to or less than about 10 $cm^2\ C^{-1}$. In some embodiments, the coloration efficiency of the charge balancing thin film is equal to or less than about 7 $cm^2\ C^{-1}$. In some embodiments, the coloration efficiency of the charge balancing thin film is equal to or less than about 5 $cm^2\ C^{-1}$. In one embodiment, the $VO_x$ charge balancing thin film has a coloration efficiency of about 1.4 $cm^2/C$, and the electrochromic thin film comprising an ECP-magenta has a coloration efficiency of 830 $cm^2/C$. In another embodiment, the charge balancing thin film comprising a $Li^+$ doped $VO_x$ has a coloration efficiency of about 1.4 $cm^2/C$.

In some embodiments, the charge balancing thin film comprising a $VO_x$ has a charge density of about 7 $mC/cm^2$. In some embodiments, the charge balancing thin film comprising a $Li^+$ doped $VO_x$ has a charge density of about 6 $mC/cm^2$.

The disclosed vanadium oxide charge balancing thin film has a porous structure with the pore size ranging from 1 to 500 nm. The disclosed vanadium oxide thin film also has a structure of being amorphous or a combination of amorphous and polycrystalline, and a nanostructured feature with at least one dimensions of nanostructure less than 500 nm. The disclosed vanadium oxide charge balancing thin film can operate in a minimally color changing mode.

The charge balancing thin film comprising $VO_x$ demonstrates quite a few great characteristics, such as high charge density, low coloration efficiency, great chemical and electrochemical stability, an electroactive voltage in close proximity to that of the ECPs.

This disclosure also presents a design method to select a material for a charge balancing thin film to pair with a working electrode and obtain a low device voltage in an electrochromic device. The method is to design the material that has an electroactive voltage in close proximity with the one from the working electrode, so that the electrochromic device can be operated in a low device voltage. The electroactive voltage can be either electrochemical onset voltage or fully charge balanced voltage (voltage when the device is operated in a fully balanced state). When the difference of the electrochemical onset voltages between the working electrode and the charge balancing electrode is within 0.8V, or when the difference of the fully charge balanced voltages between the working electrode and the charge balancing electrode is within about 2V, the electroactive voltage between two electrodes is in close proximity.

FIG. 1 schematically illustrates that rationale of choosing a charge balancing material with an electroactive voltage in close proximity with that of the ECP. As shown in the cyclic voltammetry (CV) curves in FIG. 1(A), when ECP working electrode is oxidized (shown in grey color, from current=0 to positive current, representing the occurrence of oxidation electrochemical reactions), the charge balancing materials at the counter electrode undergoes Li+ intercalation to balance the charge (shown in black color, from current=0 to negative current, representing the occurrence of reduction of electrochemical reactions). When conventional transition metal oxides (e.g. $WO_3$, $MoO_3$ and $Nb_2O_5$) are integrated as the counter electrode (CE, or called charge balancing electrode) in an ECP based ECD, the fully charge balanced voltage (voltage 2) applied onto the CE has to be extended to relatively more negative end to make sure that the charge density of CE (shaded by the dashed black lines) is equal to or higher than that of the WE (shaded by dashed grey lines). The device voltage, which is related to the difference between voltage 2 and voltage 1 (fully charge balanced voltage for CE electrode), is therefore high. In contrast, as shown in FIG. 1(B), when the disclosed $VO_x$ materials are working as the counter electrode and paired with ECP, because the charge density of the $VO_x$ is high enough in the voltage range that is in close proximity with the one from ECP (shaded by the dashed black lines), the fully charge balanced voltage (voltage 2') applied on the $VO_x$ is to less negative end, thus the device voltage is lower.

Based on the above rationale and the requirements on high charge density and low coloration efficiency, vanadium oxide materials are chosen as an example of the charge balancing materials. A series of crystalline vanadium oxide structures, including $V_2O_5$, $V_3O_7$, $V_6O_{13}$ and $VO_2(B)$, exhibit excellent specific capacity, high electrochemical potential and good electrochemical stability. For example, $V_2O_5$ has a theoretical capacity of 443 mAh/g and its high electrochemical potential (e.g. about 3.8V vs. Li/Li$^+$ for $V_2O_5$) is in close proximity with that of p-type ECPs to ensure low device voltages, and it has been extensively explored as cathode materials for Li ion batteries. In electrochromism, some crystalline phases of vanadium oxides are identified as multi-color electrochromic materials, reversibly changing between yellow/orange to blue/grey color that corresponds to electrochemical redox reactions, where Li$^+$ intercalation and extraction take place. To turn this conventionally good electrochromic material into a great charge balancing material, this disclosure presents a unique design strategy, that is to design vanadium oxide materials with further increased charge density, so higher transmissivity and little coloration change can be achieved by using thinner films.

Figure 2:
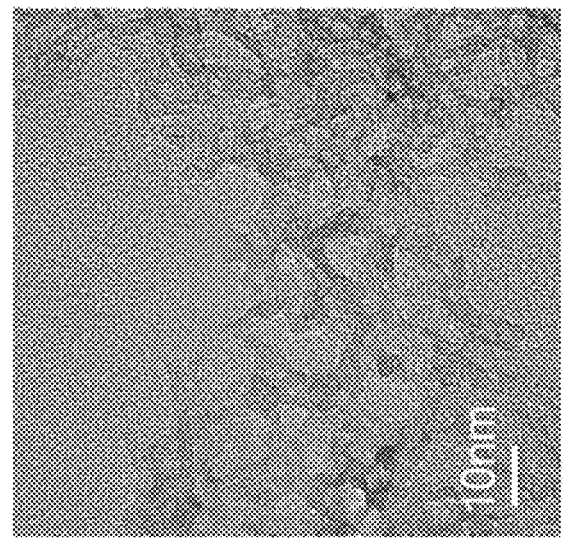
FIG. 2 (A) is a TEM image of the as-synthesized $VO_x$ particles with selected area electron diffraction (SAED) pattern.
Figure 2:
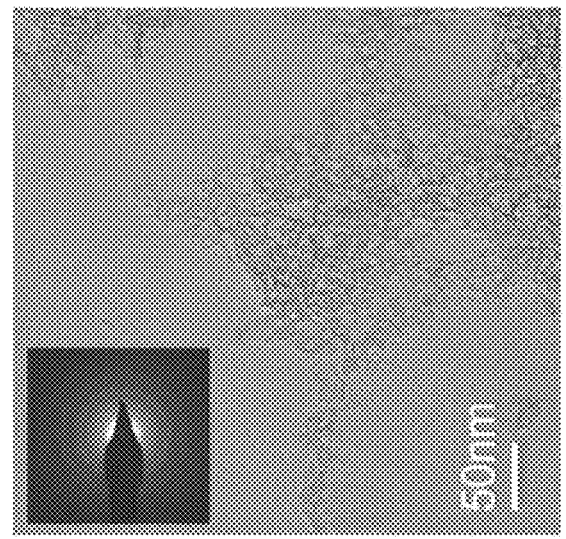
Figure 3:
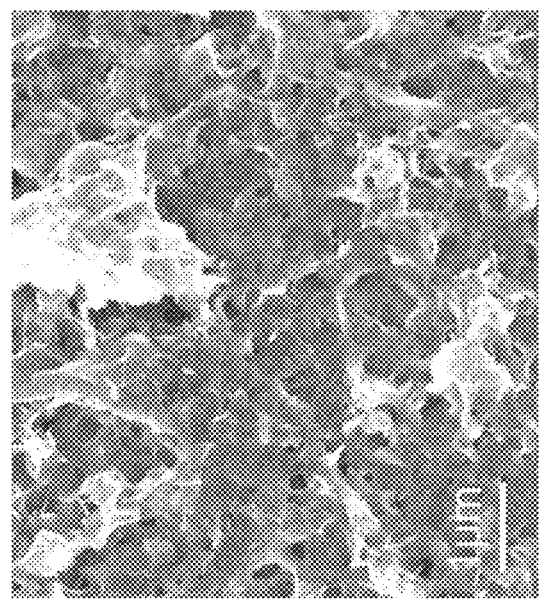
FIG. 3 (B) is XRD data of the $VO_x$ thin film.
Figure 3:
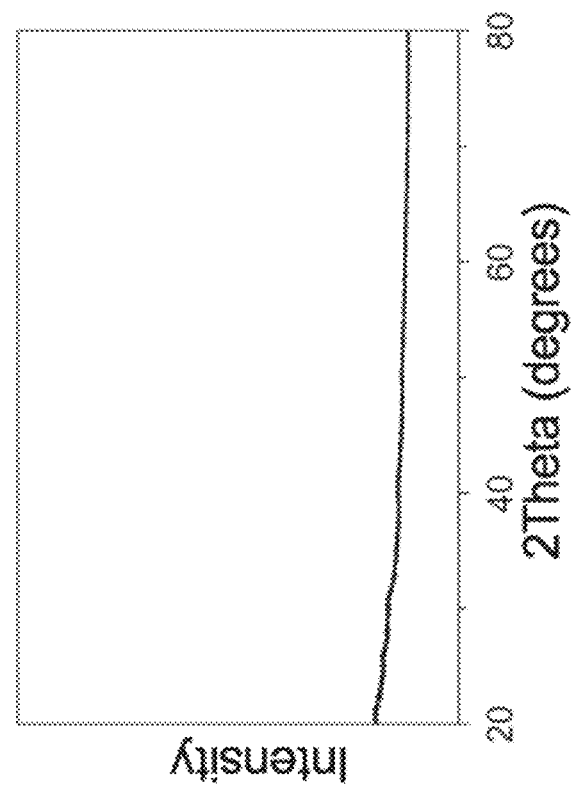

To this end, a $VO_x$ thin film with a nanostructured, porous and poorly crystalline feature is developed so as to achieve higher charge density and lower coloration efficiency than its crystalline and compact counterparts. Here, the poorly crystalline structure means either an amorphous structure or a structure of combination of amorphous and polycrystalline. The nanostructured, porous and poorly crystalline feature of the disclosed $VO_x$ materials allows to shorten the Li$^+$ ion diffusion path and facilitates the ion transfer, mitigating the intrinsically low (about $10^{-12}$-$10^{-13}$ cm$^2$/s) Li$^+$ diffusivity issue in vanadium oxides and lead to faster Li$^+$ intercalation/extraction kinetics. The amorphous feature facilitates strain relaxation during the ion intercalation and de-intercalation processes, thereby enhancing the electrochemical performances. As shown in transmission electron microscopy (TEM) image (FIG. 2 (A)), the nanostructures are composed of inter-connected, sub-10 nm particles. The particles are amorphous or near-amorphous (a combination of amorphous and polycrystalline), as both selected area electron diffraction (SAED, FIG. 2 (A) inset) and high resolution TEM (HRTEM, FIG. 2 (B)) indicate the lack of long-range crystallinity. The surface morphology of $VO_x$ thin film from the SEM images in FIG. 3 (A) shows the $VO_x$ thin film is composed of porous structures that facilitates ion diffusion and structural relaxation. The lack of sharp crystalline peaks from the XRD data of the $VO_x$ thin film in FIG. 3 (B) demonstrate that the $VO_x$ thin film is of poor crystallinity.

Figure 4B:
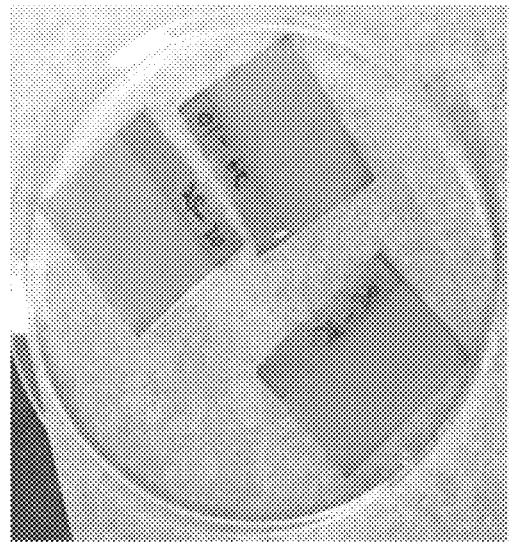
FIGS. 4(A)-(B) are images of $VO_x$ materials.
Figure 4A:
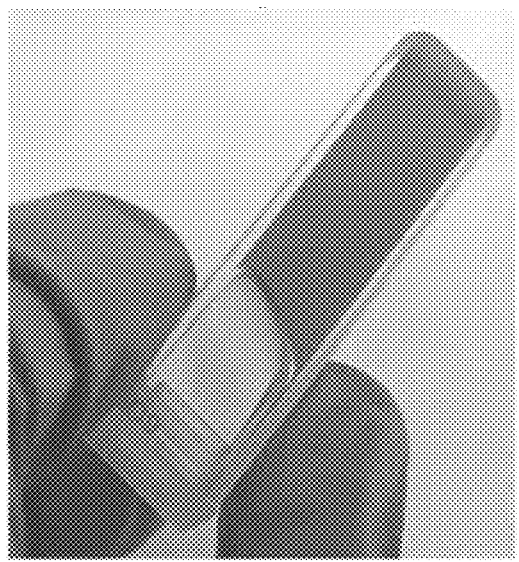
Figure 5:
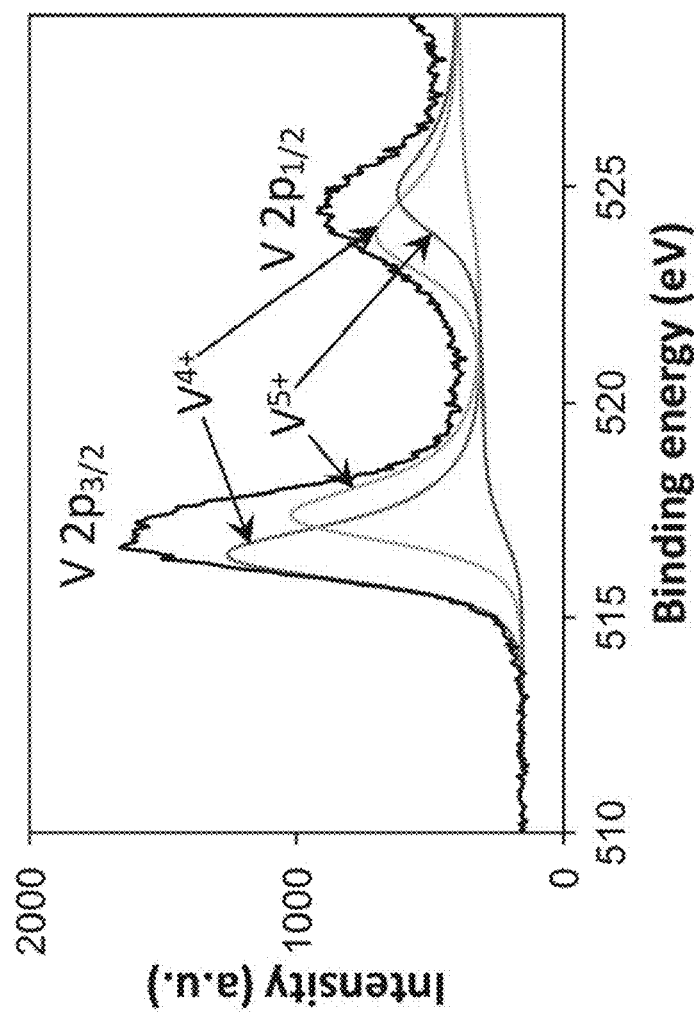
FIGS. 5(A)-(B) are XPS data of $VO_x$ thin film in the initial state and after UV-Ozone processing.
Figure 5:
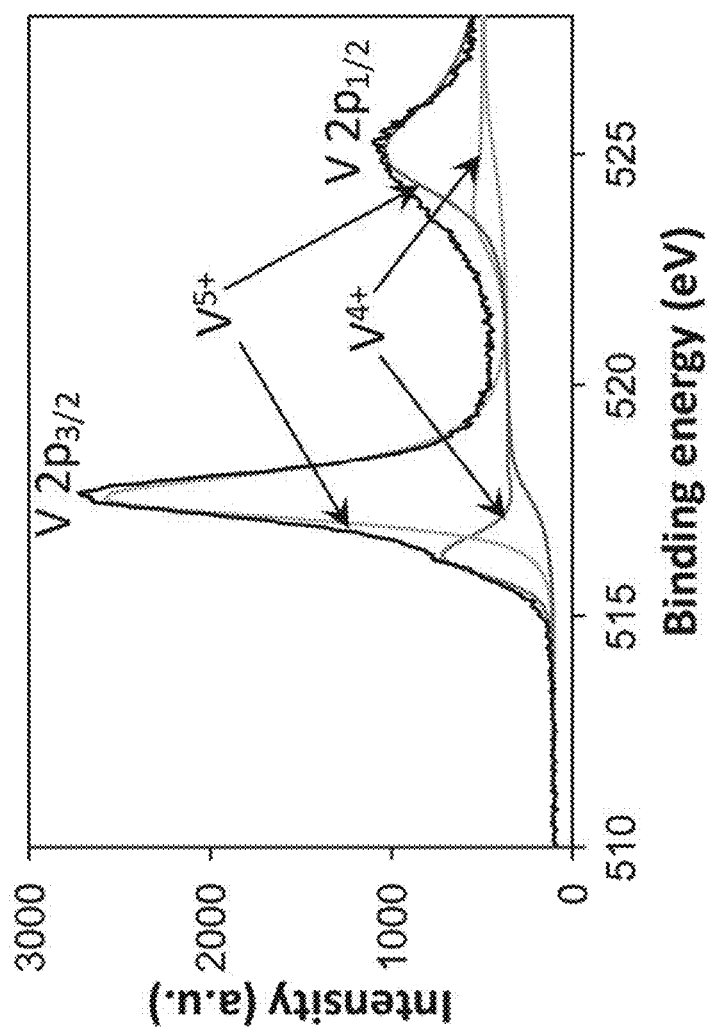

The coexistence of $V^{4+}$ and $V^{5+}$ oxidation states in the disclosed $VO_x$ thin film further enhances its optical characteristics. The coexistence of $V^{4+}$ and $V^{5+}$ oxidation states can be demonstrated by FIG. 4. As shown in FIG. 4 (A), when $VO_x$ particles dispersed in isopropanol (IPA) solution, it shows a green color which is the color between the dark blue/green color of $V^{4+}$ oxide and the orange/yellow color of $V^{5+}$ oxide. After film processing and further oxidation with UV-Ozone, $VO_x$ thin film in FIG. 4 (B) shows a yellowish-green color which further demonstrates the coexistence of $V^{4+}$ and $V^{5+}$. The $VO_x$ thin film (FIG. 4 (B)) displays more $V^{5+}$ yellowish color than its corresponding suspension (FIG. 4 (A)). This might because the UV-Ozone processing further oxidize $V^{4+}$ to $V^{5+}$, thus produces the $VO_x$ thin film with more $V^{5+}$. This is supported by XPS data of the $VO_x$ thin films after UV-Ozone processing in FIG. 5 (B) display more $V^{5+}$ and less $V^{4+}$ than the one before UV-Ozone processing in FIG. 5 (A). This further demonstrates the coexistence of $V^{4+}$ and $V^{5+}$ and also more oxidation of $V^{4+}$ to $V^{5+}$ happens to the $VO_x$ thin film.

Figure 6A:
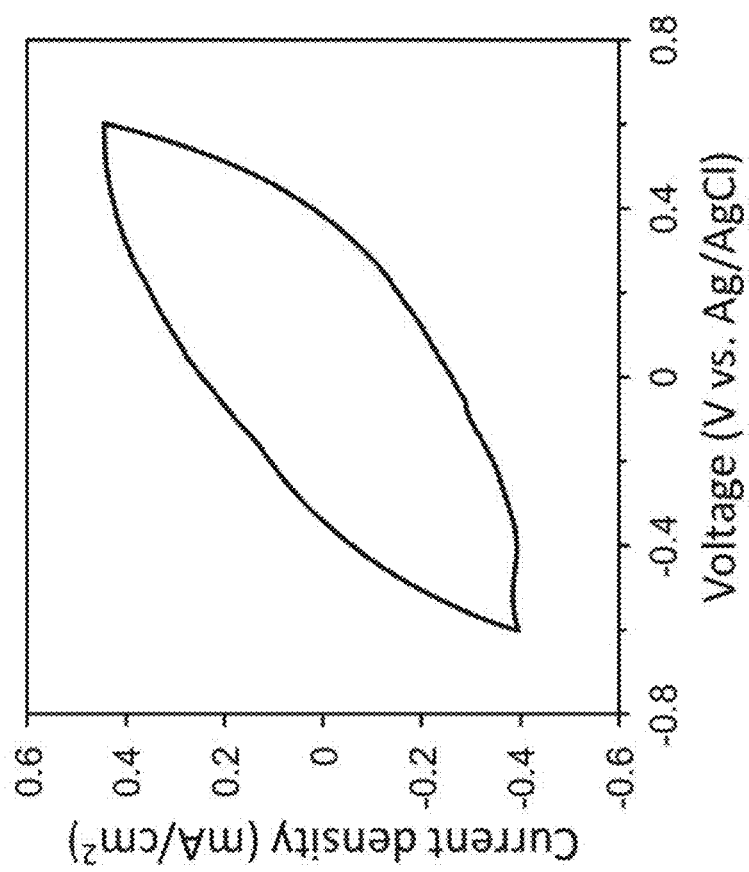
Figure 6:
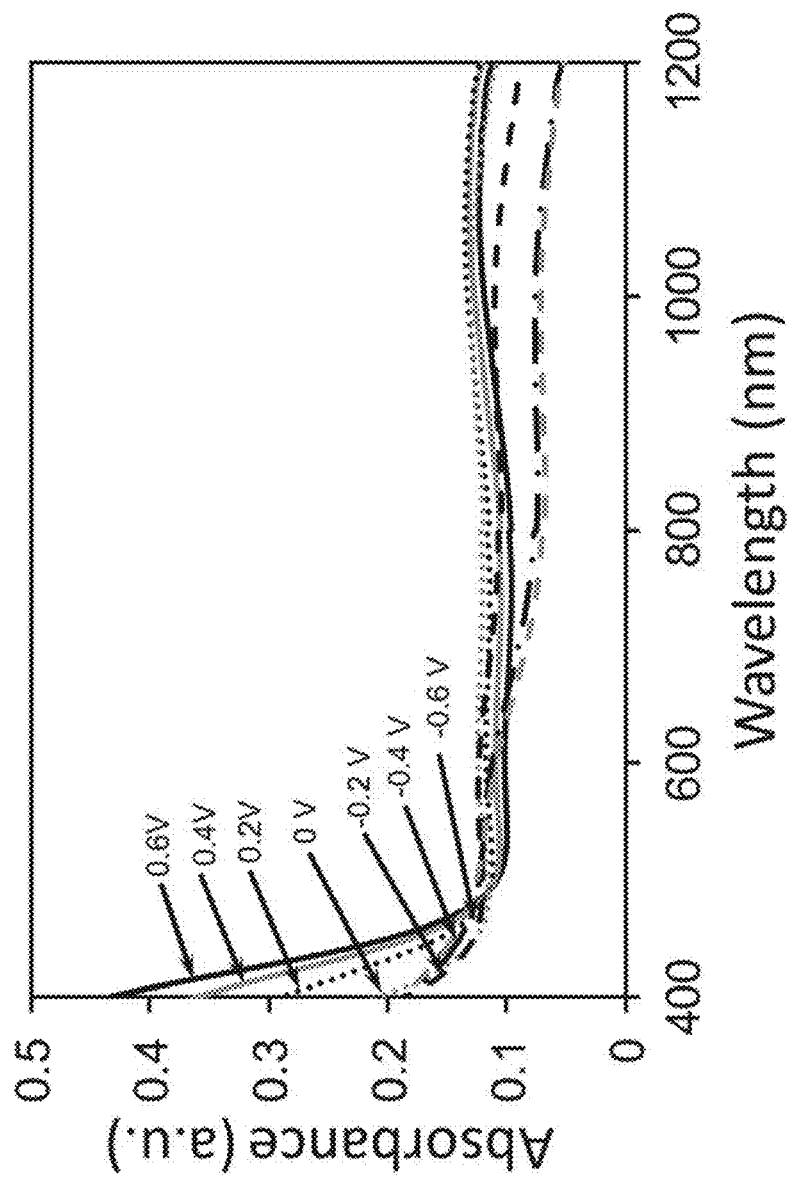
FIG. 6 (A) is cyclic voltammetry (CV) data of the $VO_x$ thin film in the voltage range of −0.6V to 0.6V vs. Ag/AgCl.
Figure 6C:
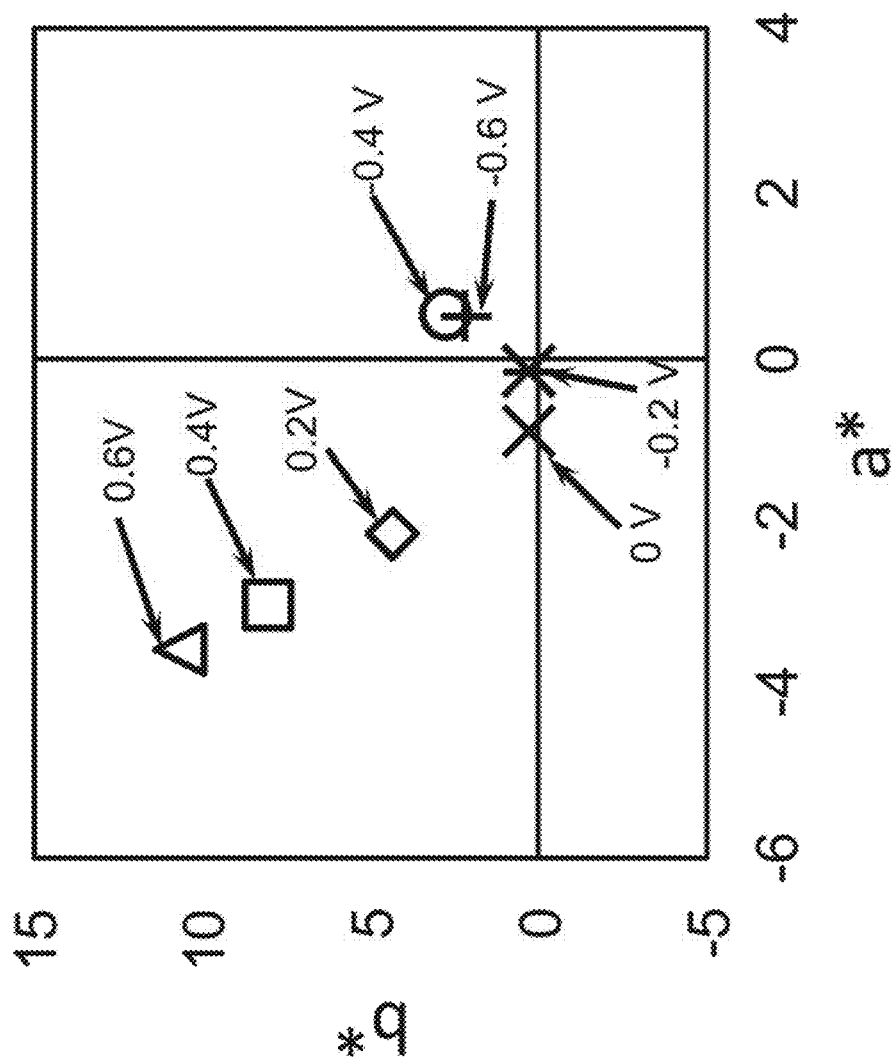
Figure 6:
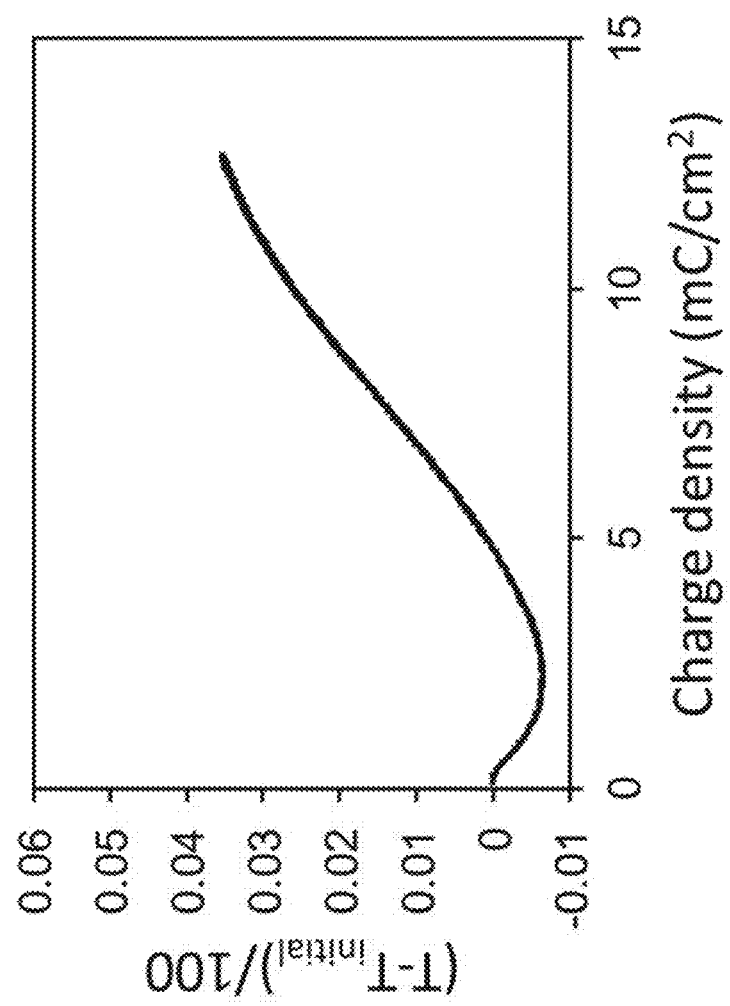

To demonstrate high charge density and low coloration efficiency of the disclosed VON thin films, it is tested in a three-electrode configuration, with $VO_x$ thin film on a indium tin oxide (ITO) substrate as the working electrode, Ag/AgCl as the reference electrode and Pt wire as the counter electrode. As shown in FIG. 6 (A), the surrounded area of cyclic voltammetry (CV) curve measured within the voltage range of −0.6V to 0.6V (vs. Ag/AgCl) can be used to derivate the charge density of the $VO_x$ thin film, which is about 7.0 mC/cm$^2$ with a corresponding about 80% transmittance at the pristine state. To test the absorbance changes of the $VO_x$ thin film, the UV-vis spectra of the $VO_x$ thin film at various voltages from −0.6V to 0.6V is shown in FIG. 6(B). As the voltage increases, absorbance spectra show limited variances, except the region close to 400 nm. This indicates high transmittance and low optical changes of the $VO_x$ thin film, which make it a great charge balancing thin film in ECD. The color hue at different voltages are shown in FIG. 6(C) as CIELAB color space. Color coordinates a* and b* plotted in FIG. 6 (C) shows that the $VO_x$ changes from near colorless state (a*=about 0 and b*=about 0) to a yellow/green color (a*=about −4 and b*=about 10) at an increasing voltage. Additionally, the transmittance changes as a function of charge density, which is correlated to the coloration efficiency, are plotted in FIG. 6(D). Transmittance at 550 nm, a wavelength our eye is most sensitive with and also a matching wavelength with ECP-magenta evaluated in the coming embodiments, is used here and in the following paragraphs. The coloration efficiency can be calculated from the changed transmittance (T) and the charge density (Q) using EQ. 1.

$$CE = \log\left(\frac{T_{0.95\Delta\%T}}{T_{initial}}\right)/Q \qquad \text{EQ. 1}$$

Where $T_{initial}$ is the initial transmittance,
$T_{0.95_{\Delta\%\ T}}$ is the transmittance at the 95% of complete transmittance change
Q is the charge density required for the transmittance change When switching from −0.6V to 0.6V vs. Ag/AgCl, the coloration efficiency of the $VO_x$ is calculated to be 1.4 cm$^2$/C, more than one order lower than the reported coloration efficiency of the conventional $V_2O_5$. This low coloration efficiency facilitates the $VO_x$ thin film to be a good charge balancing layer in ECD.

Figure 7A:
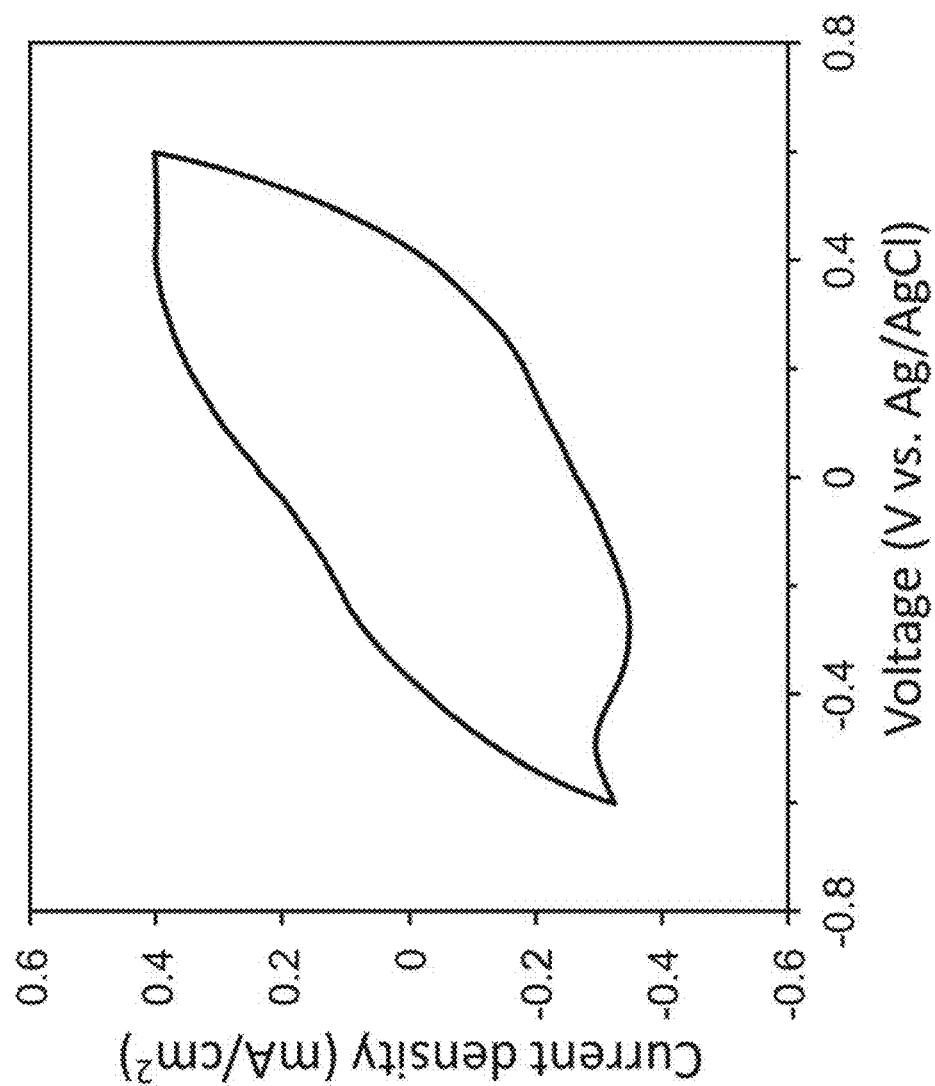
Figure 7:
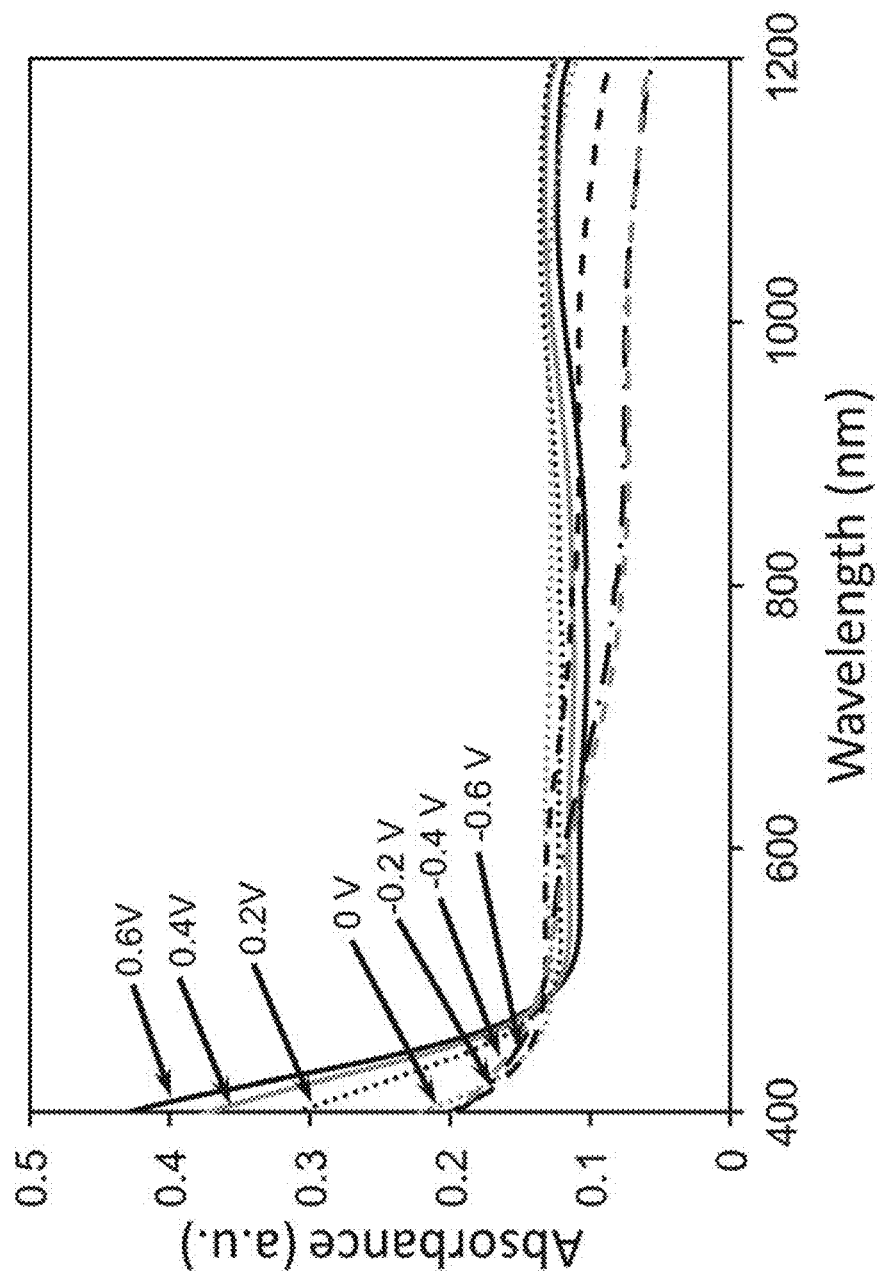
FIG. 7 (A) is CV data of the cycled $VO_x$ thin film in the voltage range of −0.6V to 0.6V vs. Ag/AgCl.
Figure 7:
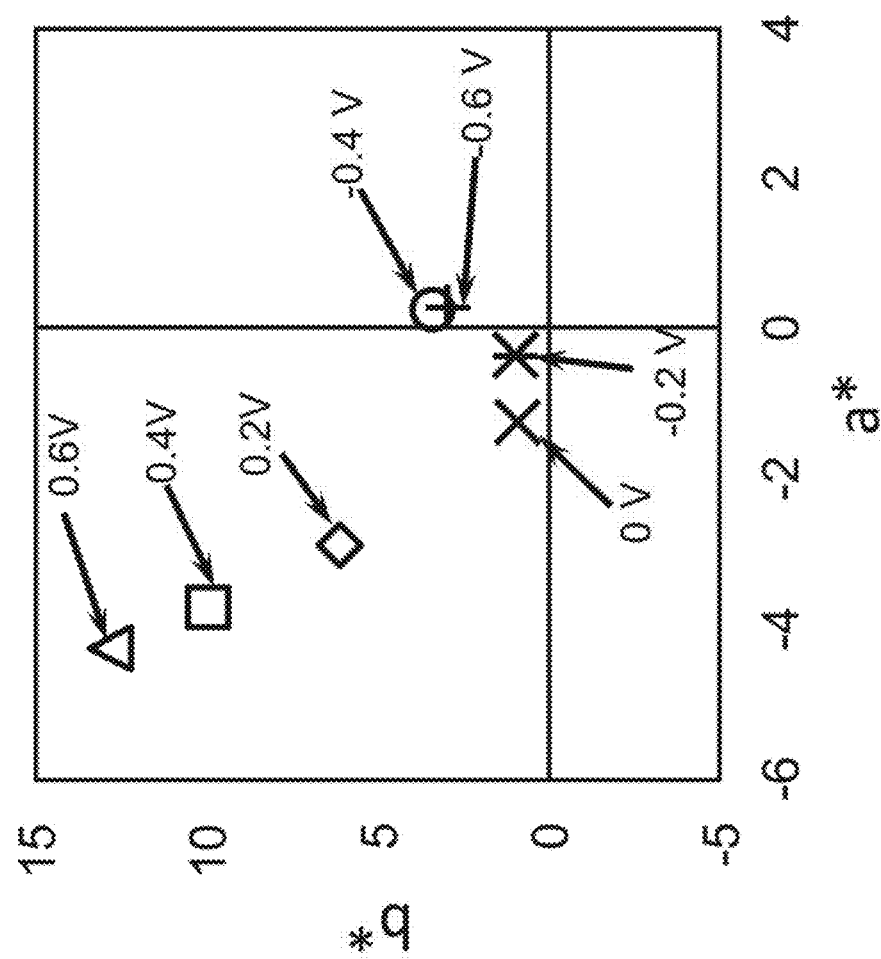
Figure 7:
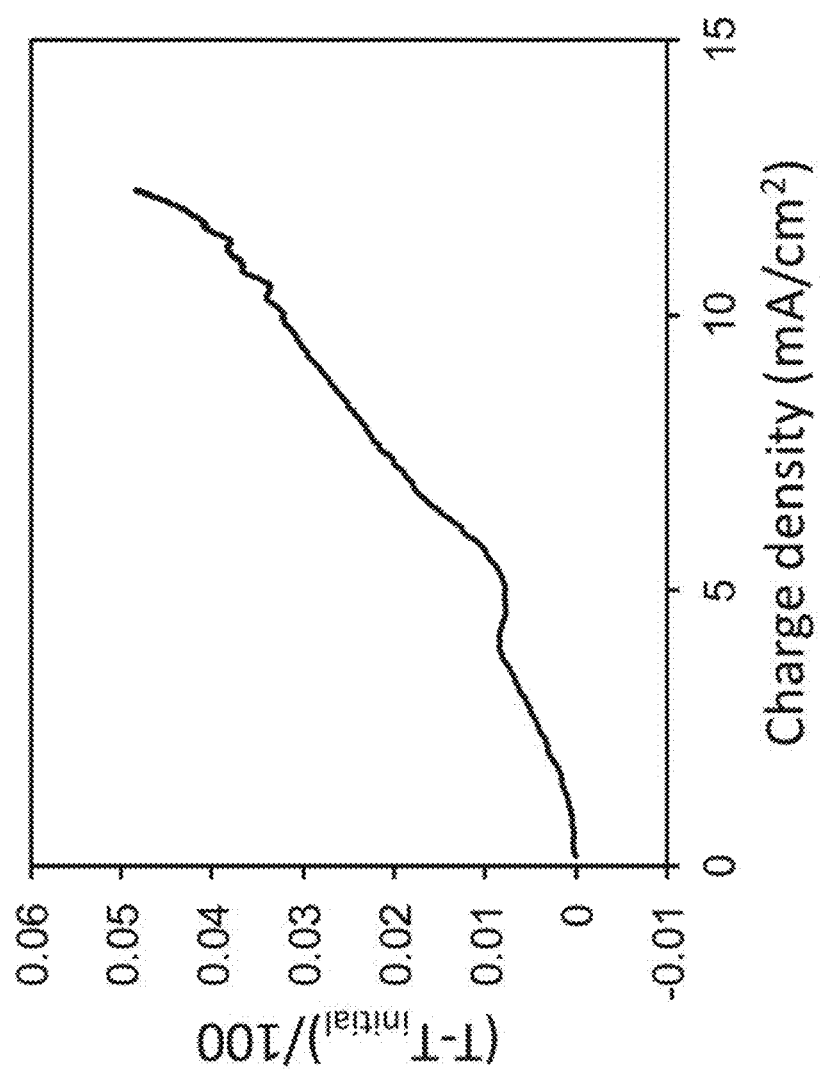

To demonstrate great chemical and electrochemical stability of the disclosed $VO_x$ thin films, the electrochemical and spectroelectrochemical performances of the $VO_x$ thin film is evaluated again in the same three-electrode configuration as FIG. 6) after 2,500 CV cycles. After 2,500 CV cycles in ambient condition, the CV curve in FIG. 7 (A), UV-vis spectra in FIG. 7 (B), the CIELAB color space in FIG. 7 (C), and the transmittance (550 nm) changes as a function of charge density in FIG. 7 (D) all remain almost the same as the corresponding ones in the initial state in FIG. 6. This indicates that the $VO_x$ thin film are chemically and electrochemically stable and are suitable to be used in electrochromic devices.

Besides the disclosed $VO_x$ vanadium oxide stated above, various embodiments are described herein also relate to a doped $VO_x$ or a doped $VO_x$ hydrate. The introduction of doped structures leads to higher conductivity and device stability while maintaining the large capacity of $VO_x$. The dopants can be the second to fourth period transition metal cations in the periodic table, such as $Li^+$, $Be^{2+}$, $Na^+$, $Mg^{2+}$, $Al^{3+}$, $K^+$, $Ca^{2+}$, $Sc^{3+}$, $Ti^{4+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Ni^{3+}$, $Zn^{2+}$, $Cu^+$, $Cu^{2+}$, $Ga^{3+}$, $Ge^{2+}$; some of fifth period transition metal cations in the periodic table, such as $Nb^{5+}$, $Nb^{6+}$, $Mo^{5+}$, $Mo^{6+}$; small non-metal cations with diameter less than 0.826 nm, such as $NH_4^+$, tetramethylammonium, tetraethylammonium, tetrabutylammonium.

In some embodiments, the dopant is $Li^+$. $Li^+$ doped $VO_x$ thin film exhibits higher transmittance while maintaining the similar charge density and coloration efficiency as the un-doped one. Also $Li^+$ doped $VO_x$ thin film leads to better ECD stability when used as a charge balancing thin film in ECDs.

In some embodiments, the dopant is $Cu^+$. The introduction of $Cu^+$ increases the conductivity and device stability while maintaining the large capacity of $VO_x$ materials.

Figure 8:
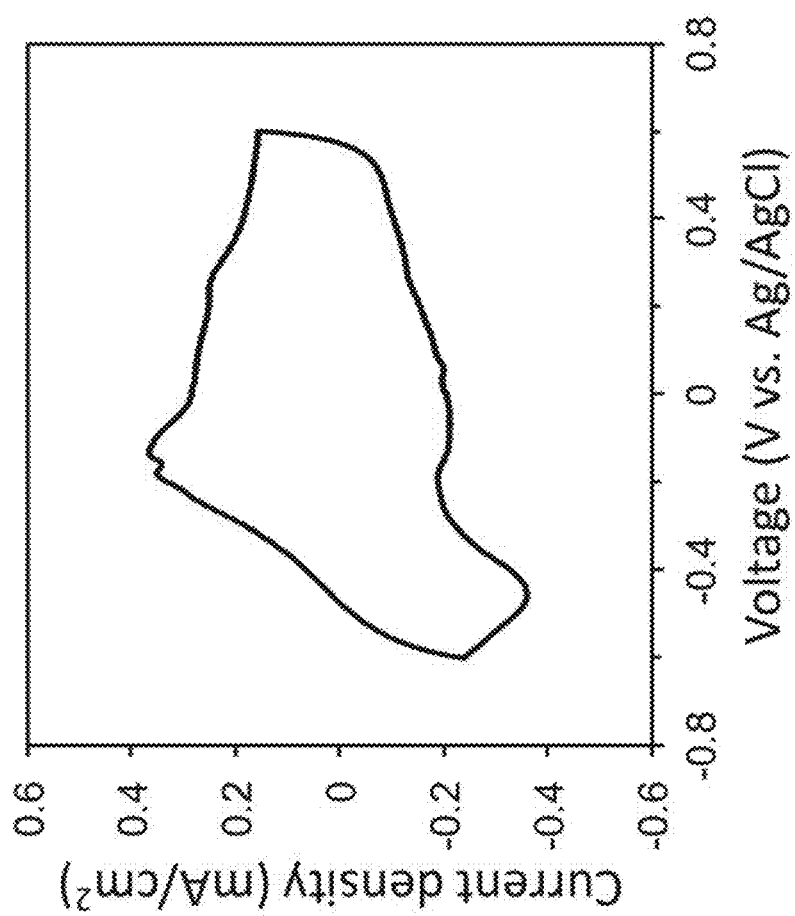
FIG. 8 (A) is CV data of the $Li^+$ doped $VO_x$ thin film in the voltage range of −0.6V to 0.6V.
Figure 8:
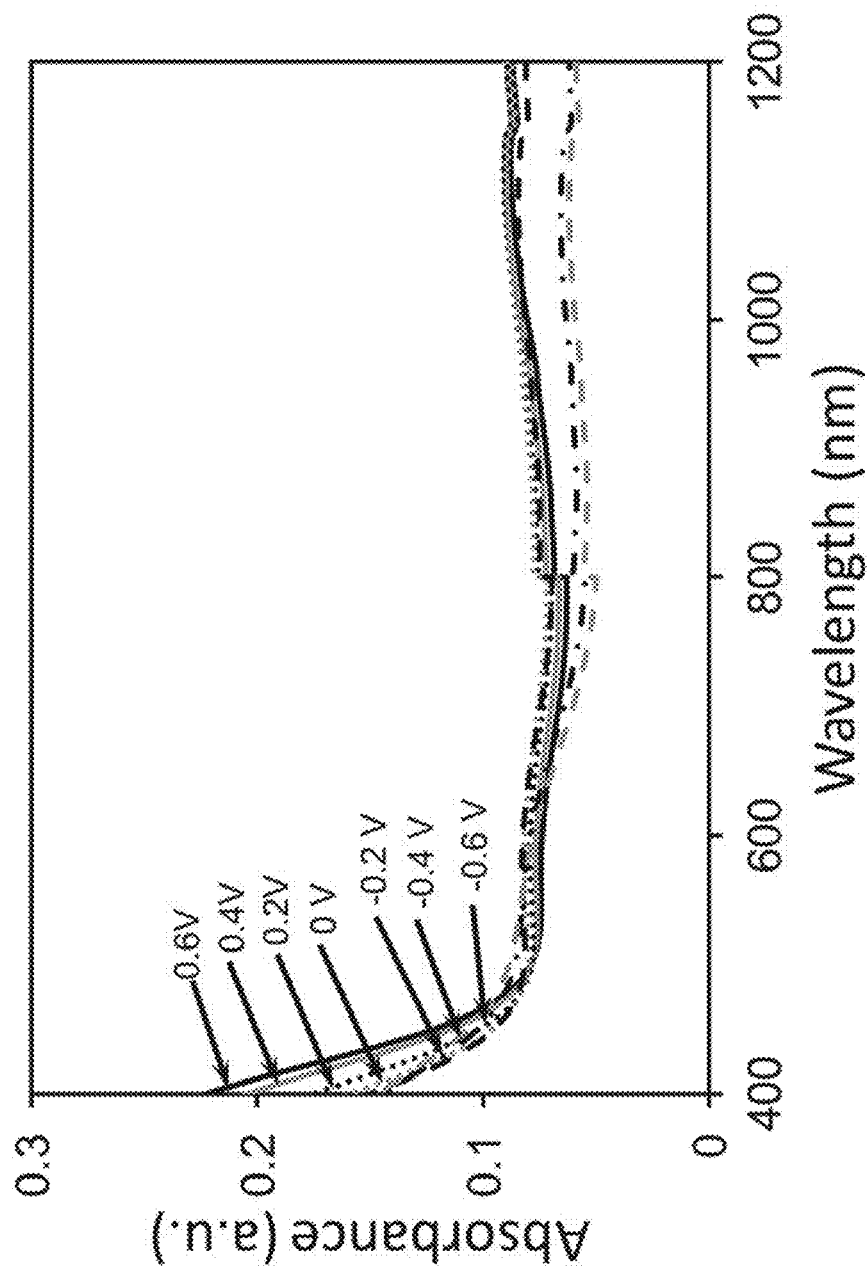
Figure 8C:
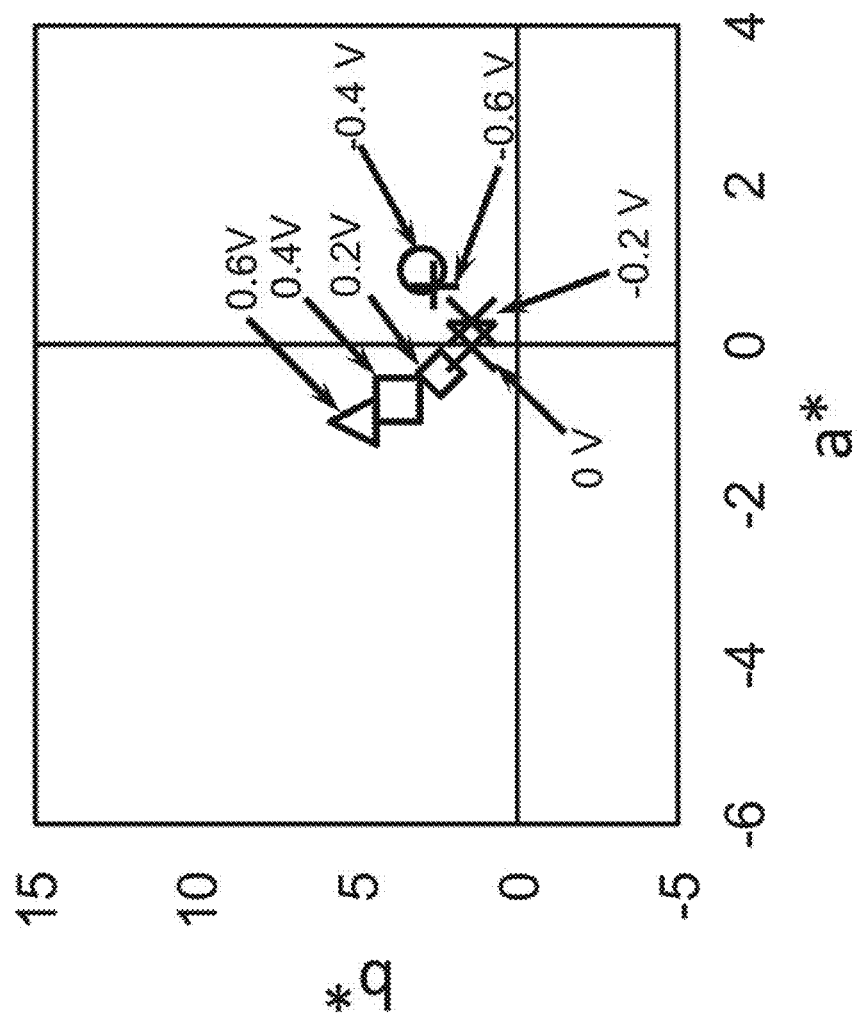
Figure 8:
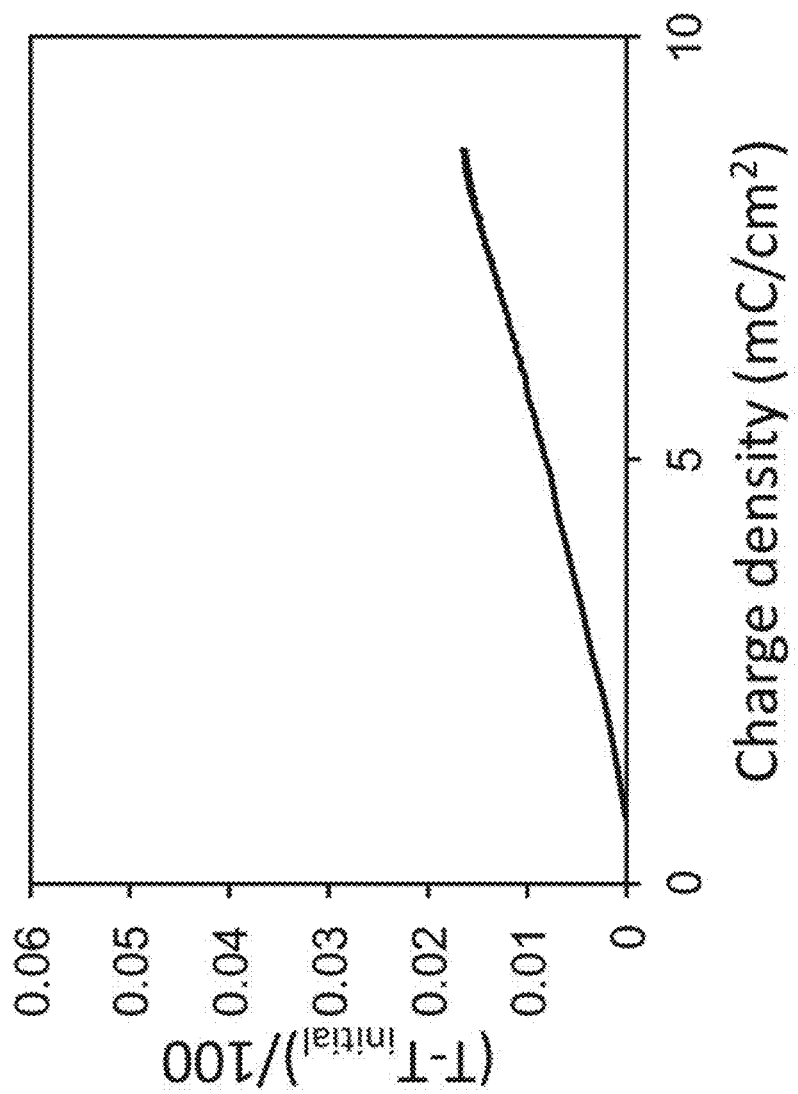
Figure 9A:
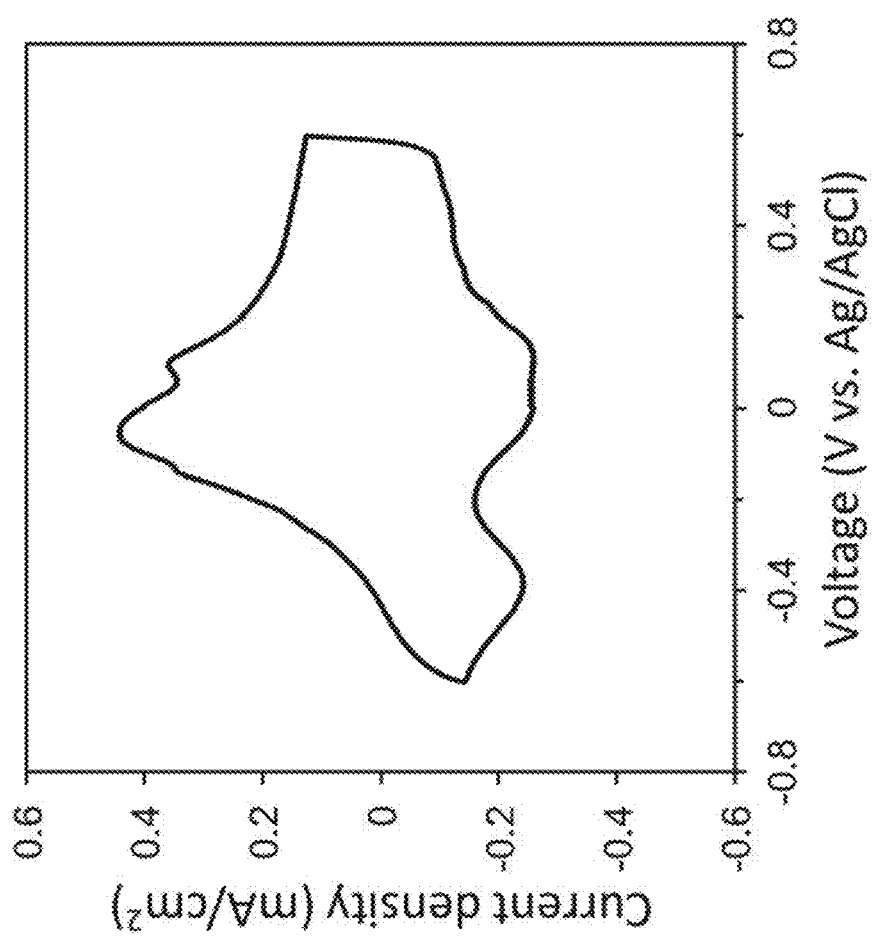
Figure 9:
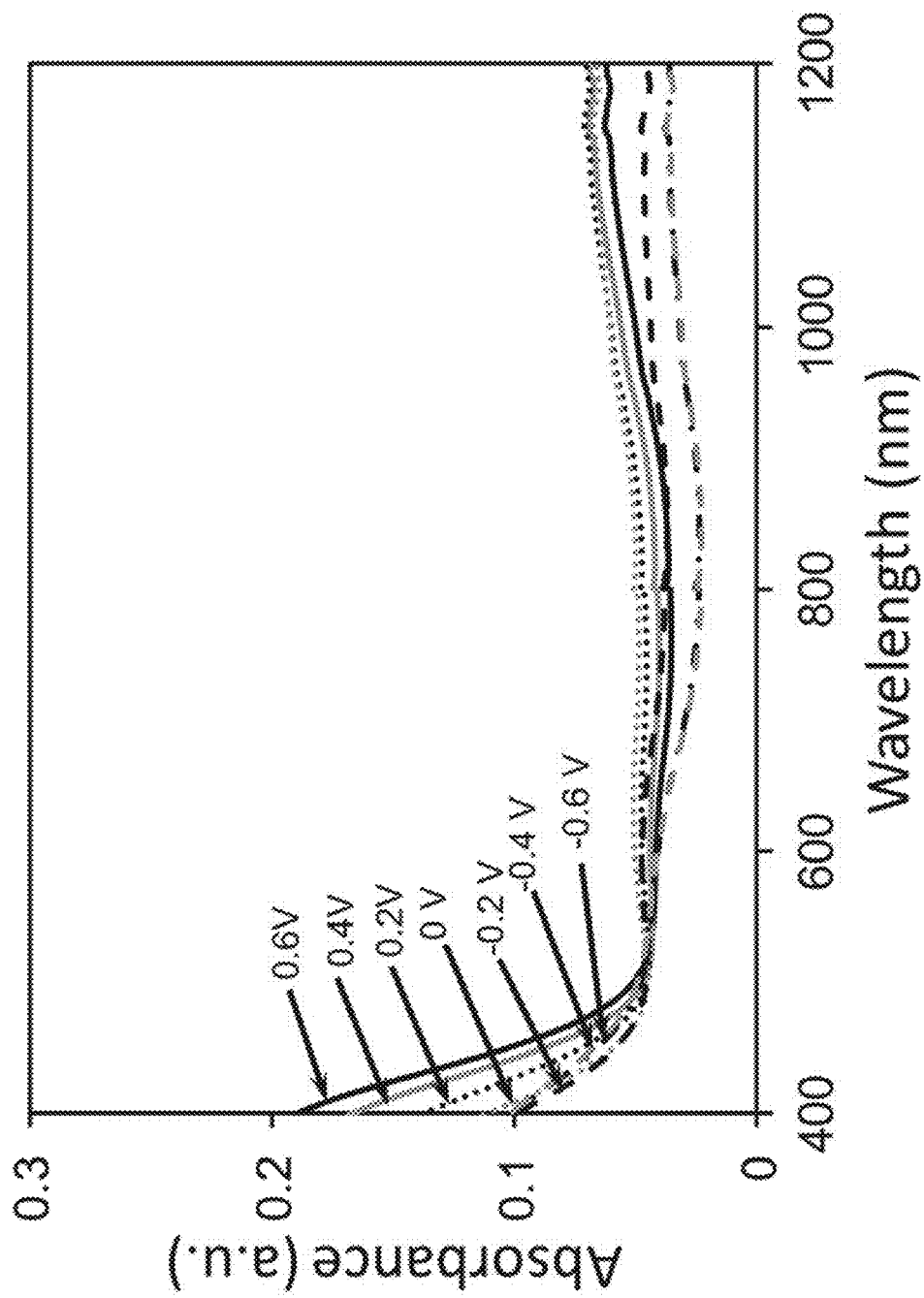
FIG. 9 (A) is CV data of the cycled $Li^+$ doped $VO_x$ thin film in the voltage range of −0.6V to 0.6V.
Figure 9C:
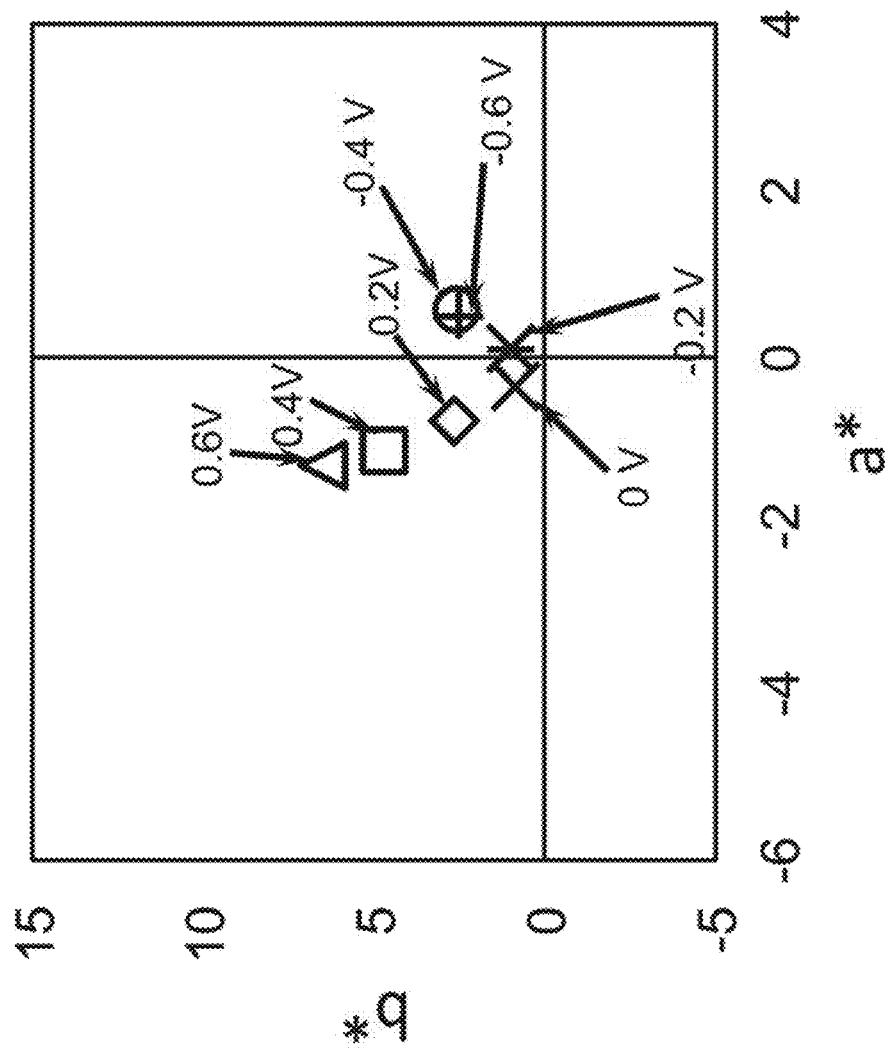
Figure 9:
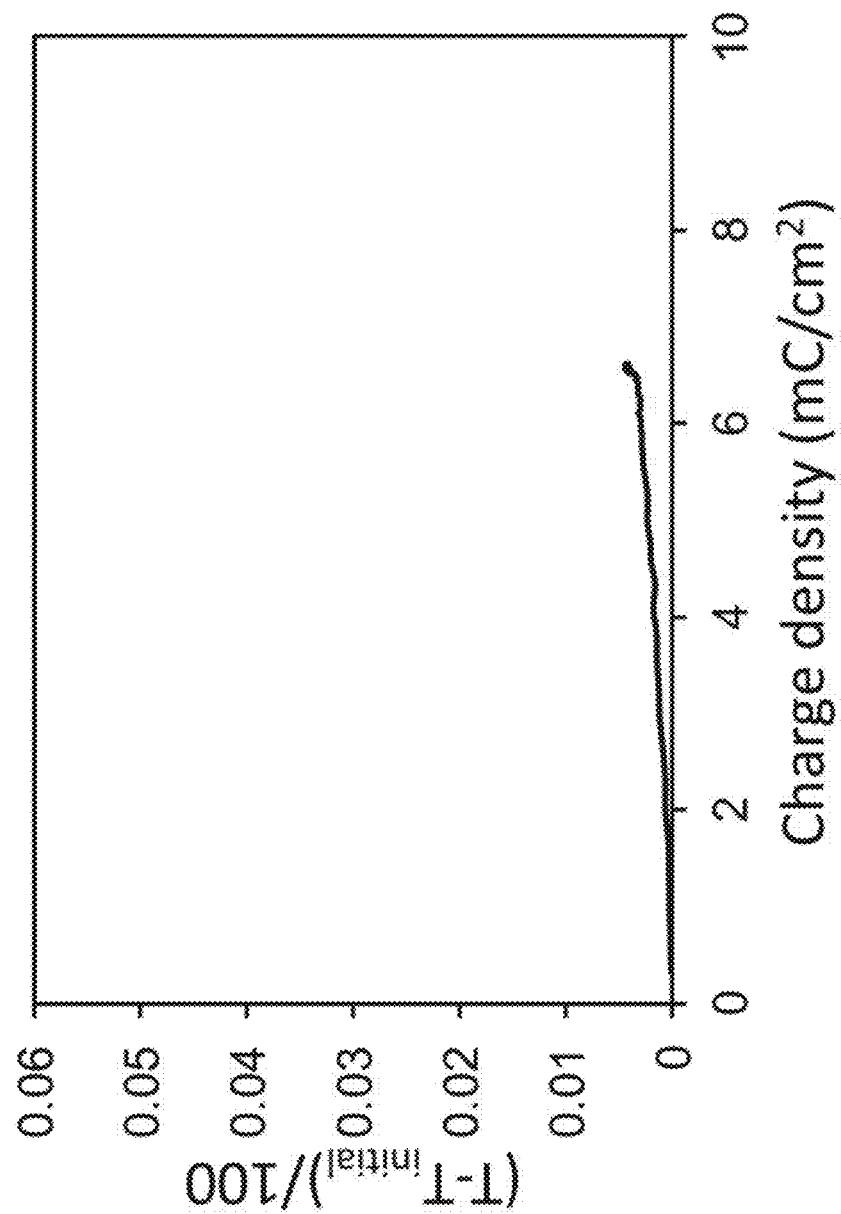

In one embodiment, the dopant is $Li^+$. The charge density and coloration efficiency of the $VO_x$ thin films are tested in a three-electrode configuration, with $Li^+$ doped $VO_x$ on ITO/glass as the working electrode, Ag/AgCl as the reference electrode and Pt wire as the counter electrode. As shown in FIG. 8 (A), the area defined by CV curve within the range of −0.6V to 0.6V correlates to the charge density, which is calculated to be 6.0 $mC/cm^2$ (which corresponding to about 85% transmittance at neutral state) for the $Li^+$ doped $VO_x$ thin film. The UV-vis spectra of the $VO_x$ thin film at various voltages within the voltage range of −0.6V to 0.6V are shown in FIG. 8 (B). Compared to the un-doped $VO_x$ thin film (FIG. 6(B)), the absorbance spectra of the $Li^+$ doped $VO_x$ thin film is much lower, especially for the range close to 400 nm, indicating lower absorbance (higher transmittance) of the $Li^+$ doped $VO_x$ thin film. The color hue of the $Li^+$ doped $VO_x$ thin film at different voltages are shown by the CIELAB color space in FIG. 8 (C). The color from −0.6V to 0.6V is more neutral for the $Li^+$ doped $VO_x$ thin film as the a* and b* values are closer to 0 when compared with the un-doped ones (FIG. 6(C)). Additionally, the transmittance (550 nm) changes as a function of charge density of the $Li^+$ doped $VO_x$ thin film at different voltages are plotted in FIG. 8 (D) when switching from −0.6V to 0.6V vs. Ag/AgCl. The coloration efficiency of the $VO_x$ is calculated to be 1.4 $cm^2/C$, similar as the one from the un-doped ones. The charge density in FIG. 9 (A), the UV-vis spectra in FIG. 9 (B), the CIELAB color space in FIG. 9 (C), and the transmittance (550 nm) changes as a function of charge density in FIG. 9 (D) of the $Li^+$ doped $VO_x$ thin film remain almost the same after 2,500 CV cycles performed in ambient condition as compared to those before cycling in FIG. 8. This indicates the chemical and electrochemical stability of the $Li^+$ doped $VO_x$ thin film. Compared with un-doped $VO_x$ thin film, the $Li^+$ doped $VO_x$ thin film shows higher transmittance while maintaining similar charge density and coloration efficiency. These indicate the $Li^+$ doped $VO_x$ thin film to be a better charge balancing thin film for ECDs than the un-doped ones.

After evaluating various characteristics of the disclosed $VO_x$ materials (no matter if it is in a doped format or not), the use of the disclosed $VO_x$ thin film as a charge balancing counter electrode in ECDs is investigated. The disclosed $VO_x$ based charge balancing counter electrode can work with any electrochromic materials as working electrode. And the electrochemical potential of the disclosed $VO_x$ thin film is in close proximity with the potential of some electrochromic materials, for example ECP and $WO_3$, so it is particularly beneficial to be used as charge balancing thin film in an ECD to ensure a low device voltage. To demonstrate its performance, ECP-magenta is used as an example ECP in the following ECD embodiments.

Figure 10B:
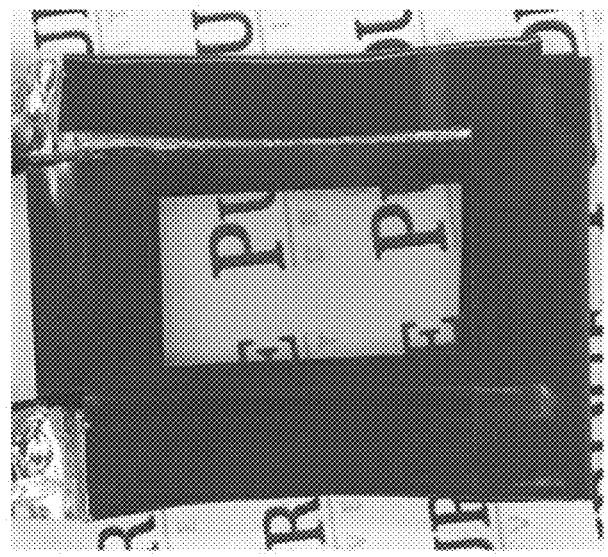
FIGS. 10(A)-(B) contain the images of an example ECD with the disclosed $VO_x$ thin film as the counter electrode, ECP-magenta as the working electrode, in-situ crosslinked 1:1 PEGDA:0.2M LiTFSI as the electrolyte.
Figure 10A:
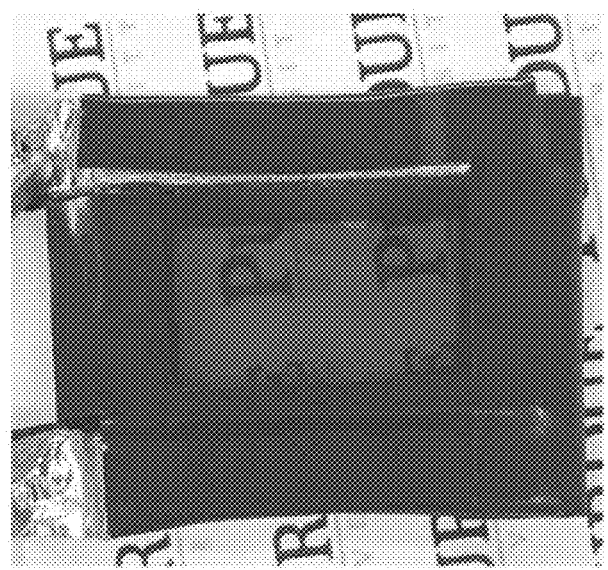
Figure 11A:
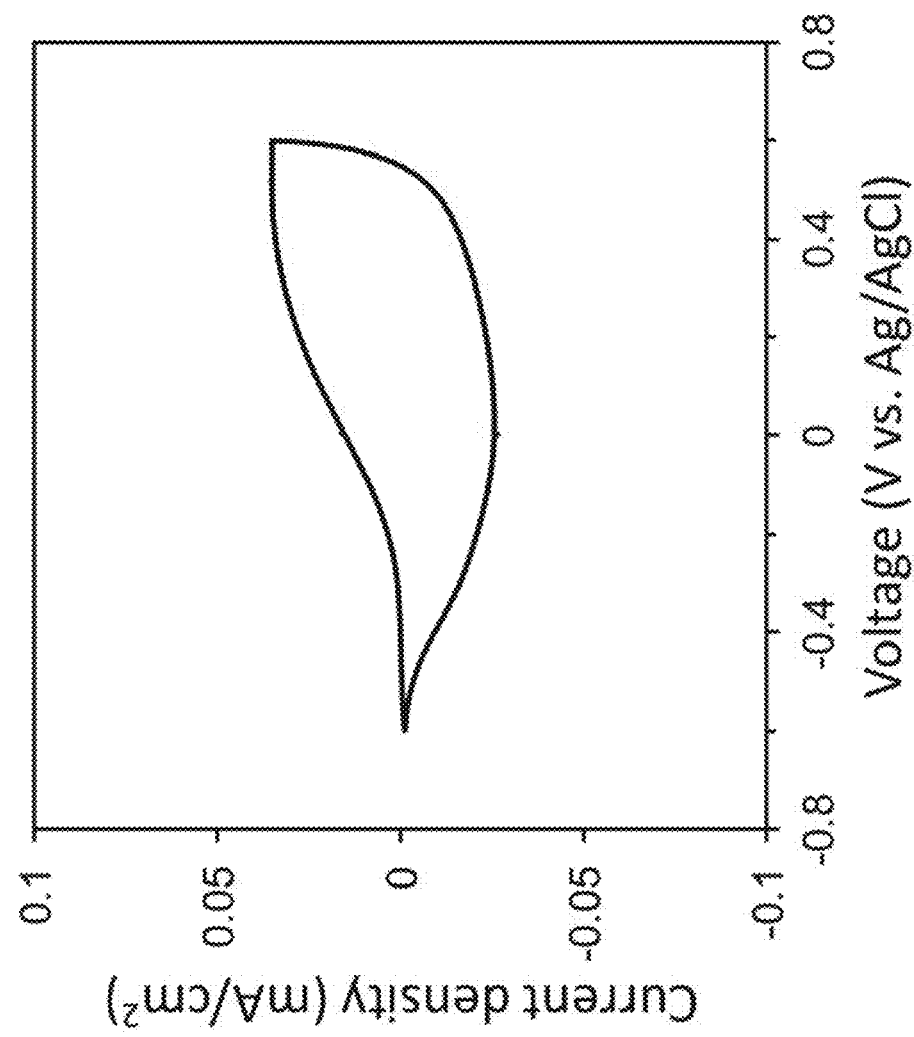
Figure 11:
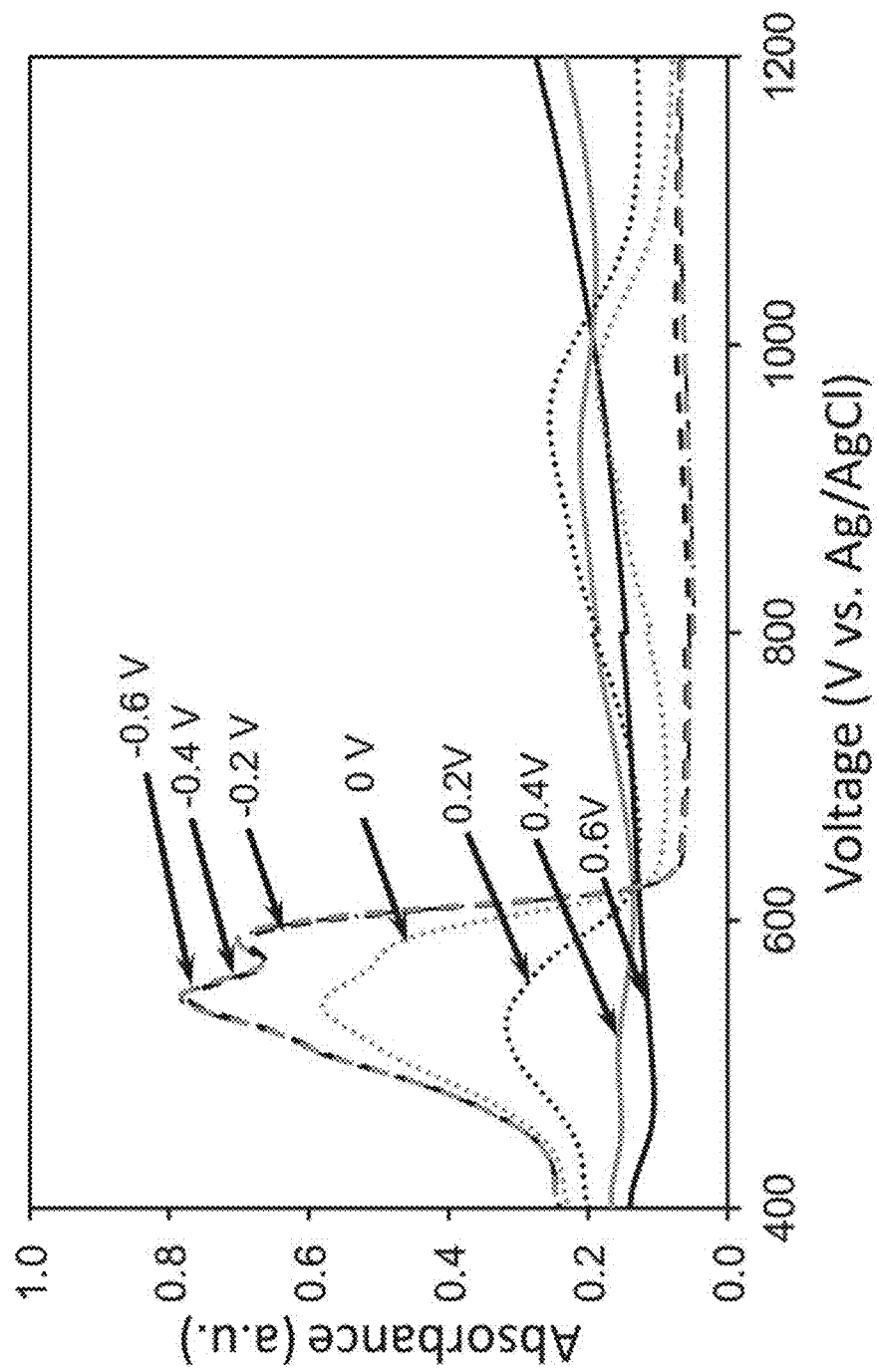
FIG. 11 (A) is CV data of the ECP magenta-$VO_x$ devices after electrochemical break-in processes.
Figure 11C:
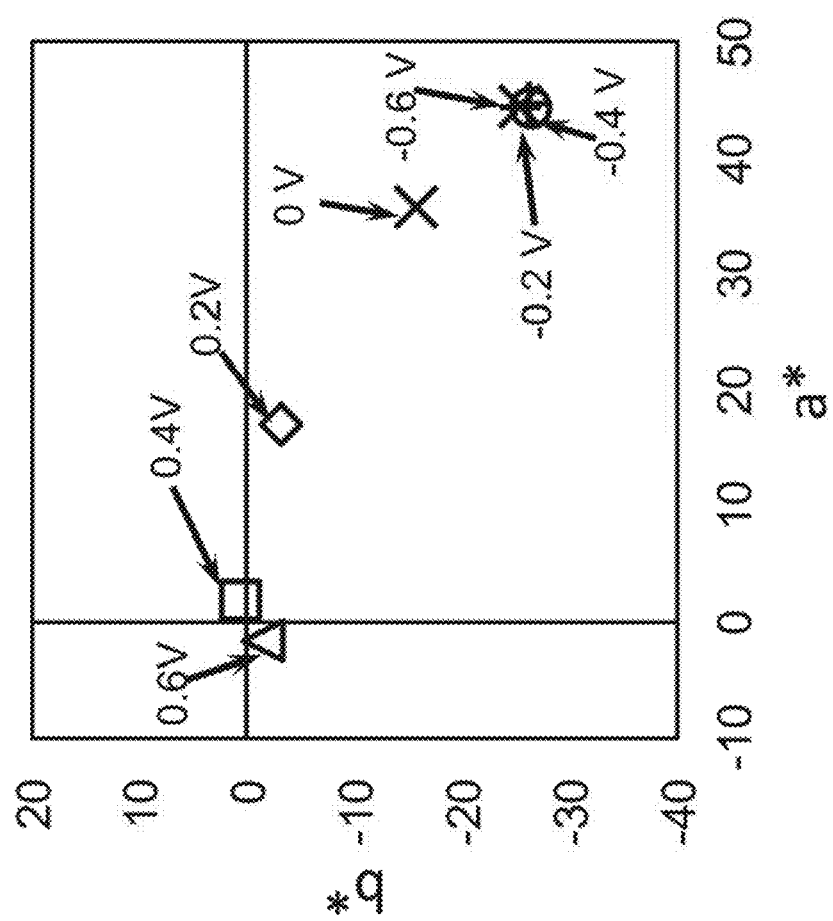
Figure 11D:
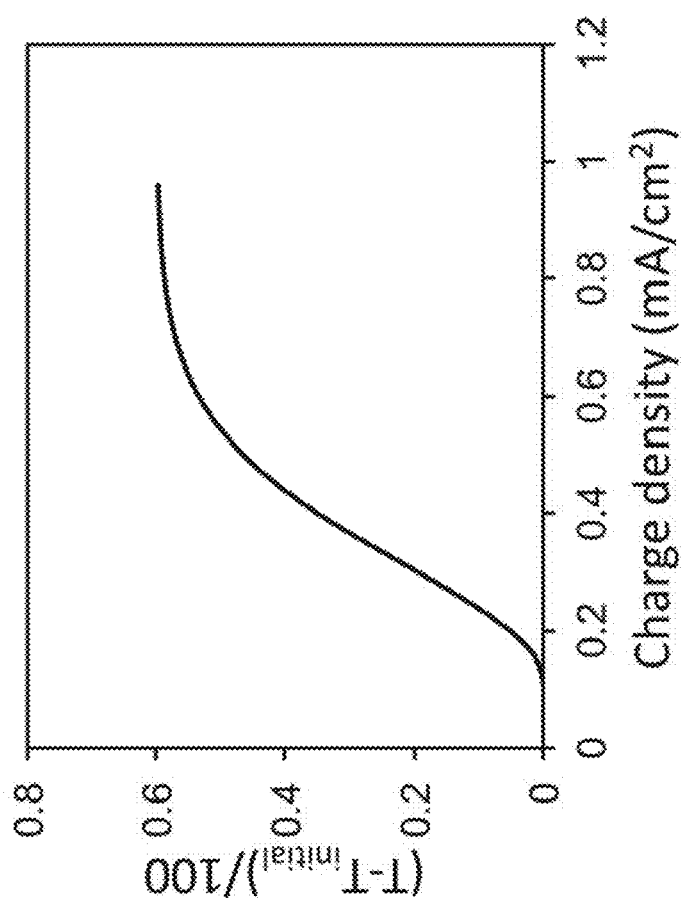

In one embodiment, the disclosed $VO_x$ is assembled into an electrochromic device (ECD) using ECP-magenta as the working electrode, in-situ crosslinked 1:1 PEGDA:0.2M LiTFSI as the electrolyte, the disclosed $VO_x$ thin film as the counter electrode. The charge density of the $VO_x$ charge balancing thin film is about 7 $mC/cm^2$ at about 80% transmittance, higher than the one for ECP-magenta of about 1 $mC/cm^2$. And the coloration efficiency of the $VO_x$ charge balancing thin film is 1.4 $cm^2/C$, much lower than the one for ECP-magenta of about 830 $cm^2/C$. The images of the ECD are shown in FIG. 10 (A) as a colored state and in FIG. 10 (B) as a bleached state. The CV data in FIG. 11 (A) show that the voltage range of −0.6V to 0.6V is a proper working window for the described ECD. At the colored state, the device current is low because the neutral ECP-magenta working electrode has lower conductivity. UV-vis spectra in FIG. 11 (B) show great changes on absorbance spectra during the coloration process, indicating the successful switch of ECD between the colored state and the bleached state. The CIELAB color space of the ECD is shown in FIG. 11 (C). The device switch between a vibrantly colored magenta (a*=44.4 and b*=−26.3) to a near colorless, bleached state (a*=−1.6 and b*=−1.5). The great transmittance (550 nm) change as a function of charge density in FIG. 11 (D) indicates a great optical contrast (>60%) of the ECD. The results demonstrate the $VO_x$ works excellent as an minimally color changing ion storage material, and provides good charge balancing function without inducing much color.

The stability of ECD is investigated by comparing the switching efficiency and kinetics from double potential step chronoabsorptometry (DPSC) experiments before and after stepwise potential fast chronoamperometry (SPFC) cycles. DPSC experiments are performed by applying three SPFC cycle with the cell voltage hold at 0.6V for 30 s, then at −0.6V for 30 s and the transmittance changes of the device are monitored by UV-Vis spectra. SPFC cycles are performed by alternating between 0.6V and −0.6V with each voltage for 5 seconds. As shown in FIG. 12, black curve represents the data at the initial state while the grey curve represents the data after 50,000 SPFC cycles. As shown in FIG. 12 (A), the transmittance change as a function of charge density is altered (left shifted) after 50,000 SPFC cycles, indicating an increased coloration efficiency or a decreased required charge amount to switch from the colored state to the bleached state after prolonged cycling. Kinetics data before and after 50,000 SPFC cycles are shown in FIG. 12 (B). The optical contrast between the bleached state and the colored state slightly drops from 65% (difference between 78% for bleached state and 13% for colored state) to 61% (difference between 73% for bleached state and 12% for colored state), while shorter switching times are shown during both the bleaching process (from original 4 s to 2.1 s after cycling) and the coloration process (from original 2.7 s to 0.7 s after cycling). Great electrochromic stability is demonstrated for the ECD with $VO_x$ thin film. The device stability of about 50,000 switching cycles under ambient conditions is about an order of magnitude higher than the previously reported transition metal oxide based MCC materials. The great electrochemical and electrochromic stability shows the importance of close electroactive voltages between ECP and the charge balancing materials, providing materials design criteria for the polymer electrochromic devices with high optical performance and excellent cycling stability.

Figure 13:
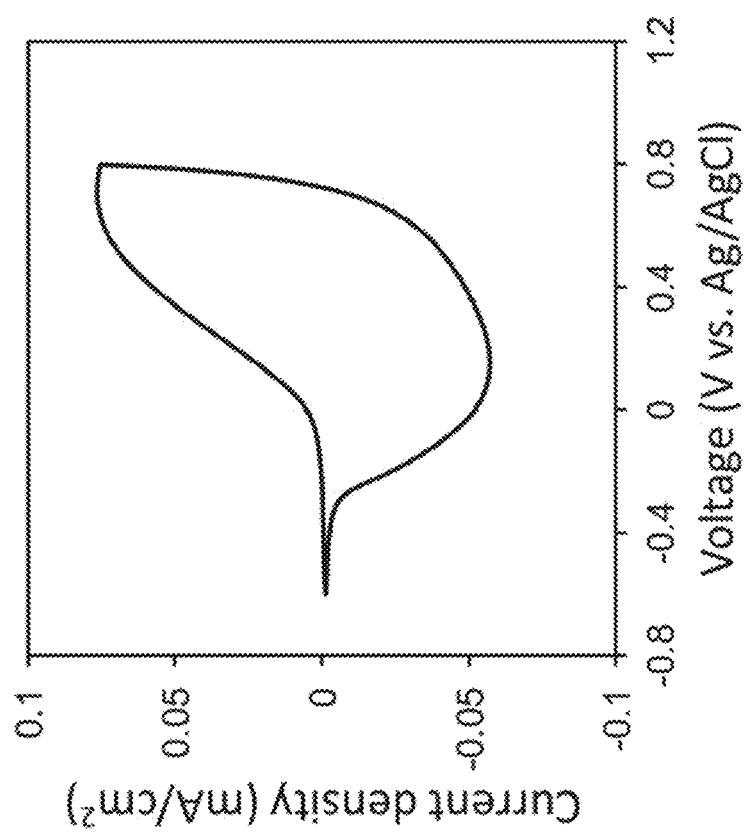
FIGS. 13 (A)-(D) contain the performance data of an ECD with the disclosed $Li^+$ doped $VO_x$ thin film as the counter electrode, ECP-magenta as the working electrode, in-situ crosslinked 1:1 PEGDA:0.2M LiTFSI as the electrolyte.
Figure 13:
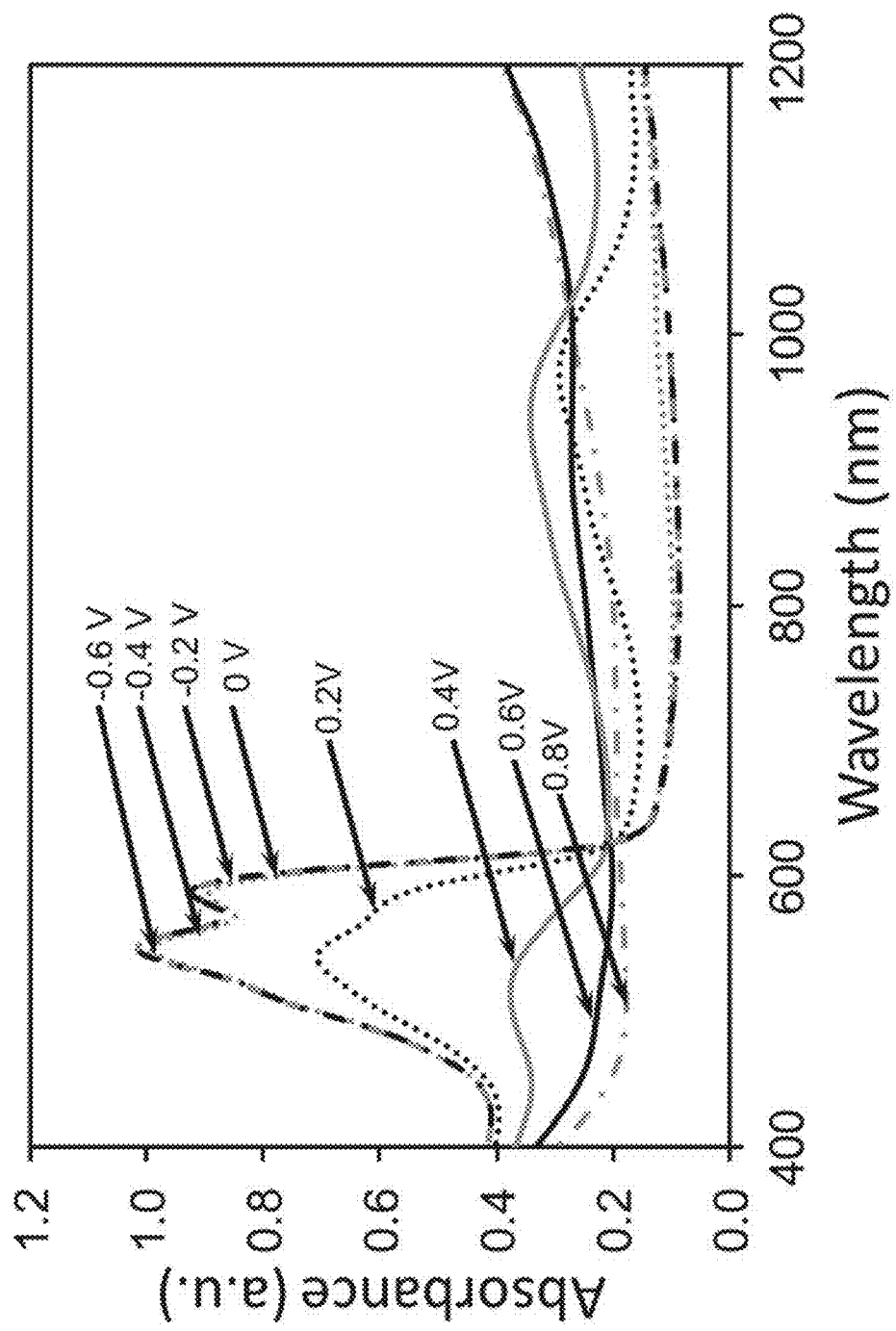
Figure 13:
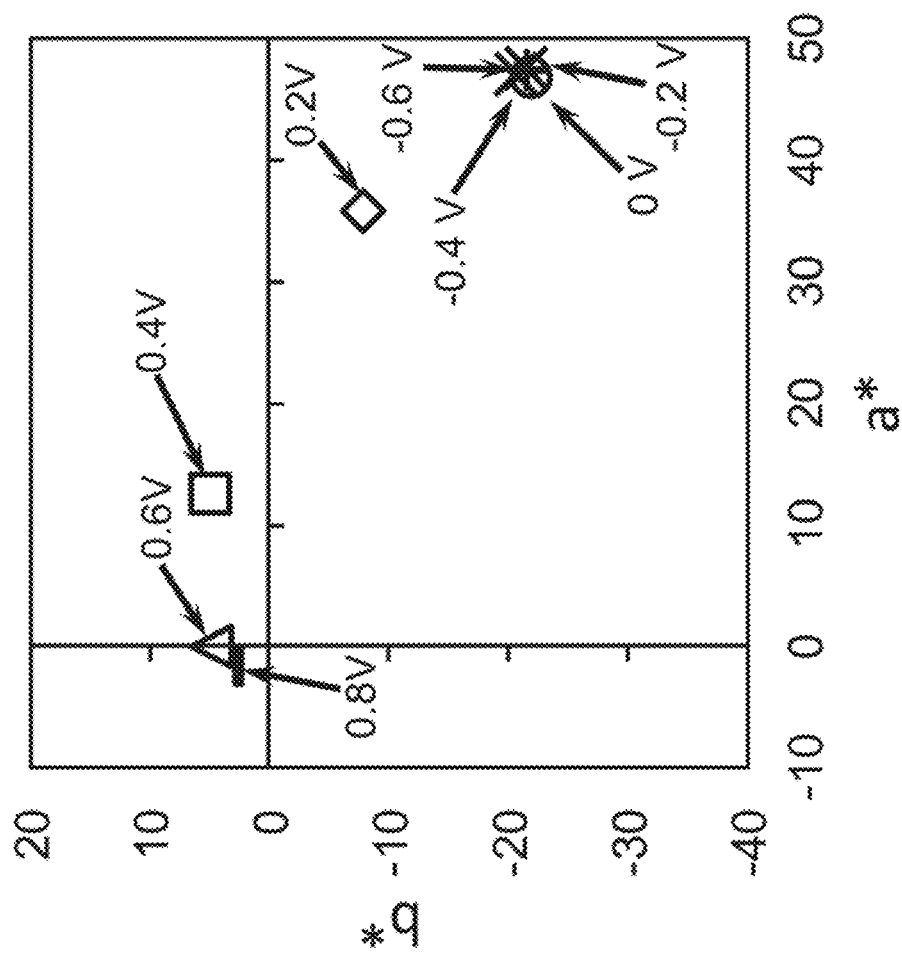
Figure 13:
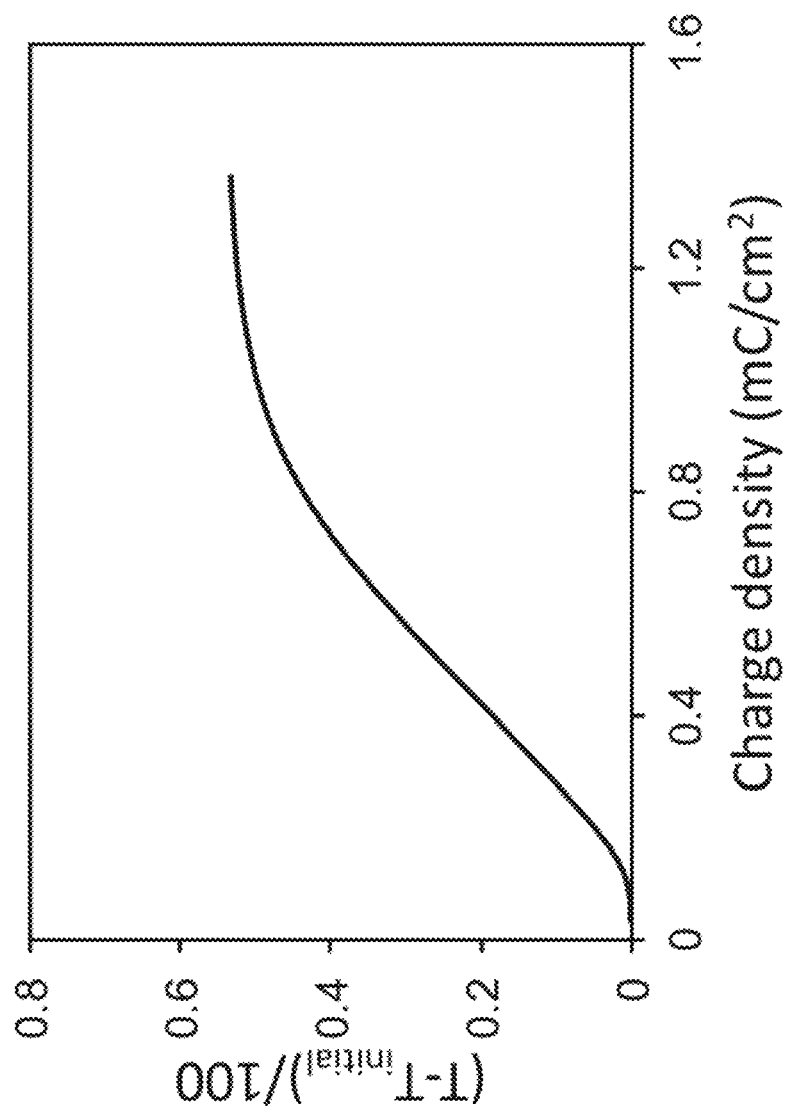

In another embodiment, the disclosed $Li^+$ doped $VO_x$ thin film is assembled into an electrochromic device (ECD) using ECP-magenta as the working electrode, in-situ crosslinked 1:1 PEGDA:0.2M LiTFSI as the electrolyte, the disclosed $Li^+$ doped $VO_x$ as the counter electrode material in an unbalanced configuration (minimally color changing mode) for better device performance. The charge density of the doped $VO_x$ charge balancing thin film is about 6 $mC/cm^2$ at about 85% transmittance, higher than the one for ECP-magenta of about 1 $mC/cm^2$. And the coloration efficiency of the doped $VO_x$ charge balancing thin film is 1.4 $cm^2/C$, much lower than the one for ECP-magenta of about 830 $cm^2/C$. The CV data in FIG. 13 (A) show that the voltage range of −0.6V to 0.8V is a proper working window for the described ECD. The great absorbance changes (>1.0 at the colored state, <0.2 at the bleached state) in FIG. 13 (B), vibrantly colored magenta (a*=about 50 and b*=about −20) at the colored stated in FIG. 13 (C), and great transmittance (550 nm) changes as a function of charge density in FIG. 13 (D) are observed. All of these indicate great electrochromic performance of ECD with $Li^+$ doped $VO_x$ thin film too.

Figure 14:
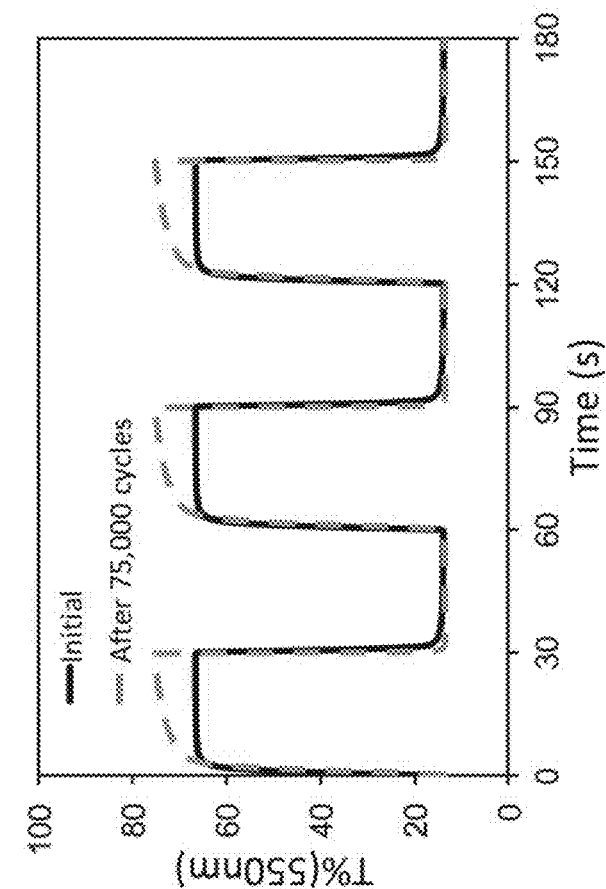
FIG. 14 (A) is a diagram illustrating transmittance changes as a function of charge density.
Figure 14:
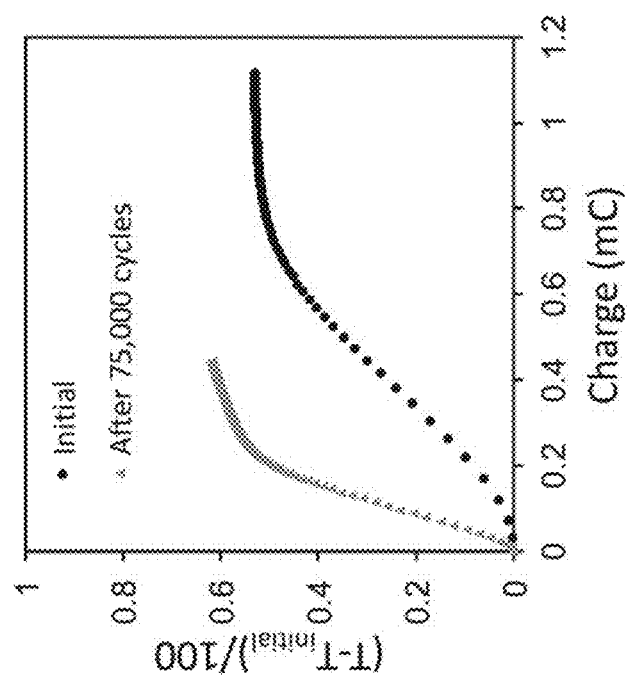

The effect of the electrochemical cycling on the switching kinetics and coloration efficiency is shown in FIG. 14 for ECD with $Li^+$ doped $VO_x$ thin film. Like the ECD with un-doped $VO_x$ thin film, ECD with $Li^+$ doped $VO_x$ thin film shows altered transmittance change as a function of charge density which indicates increasing coloration efficiency. However, unlike ECD with un-doped $VO_x$ thin film, the optical contrast of ECD with $Li^+$ doped $VO_x$ thin film increases even after longer cycling, 75,000 cycles (50,000 for ECD with un-doped $VO_x$ thin film). The stability over more switching cycles indicate better electrochemical and electrochromic stability of ECD with $Li^+$ doped $VO_x$ thin film.

In another aspect, the present disclosure is directed to methods of preparing the porous $VO_x$ thin film. The method first needs to produce a $VO_x$ nanostructure based suspension. It includes: first preparing $VO_2$ nanostructures suspension by chemically transforming ZnO nanoparticle suspension into $VO_2$ nanostructure suspension by adding a soluble vanadium salt solution and an optional dopant; secondly producing a partially oxidized $VO_x$ suspension by a first oxidization step to transform part of $V^{4+}$ to $V^{5+}$ with a $V^{5+}$ precursor. To facilitate the conversion of ZnO nanoparticles to $VO_2$ nanostructure and to obtain a more homogeneous $VO_2$ nanostructure based suspension, an optional pH adjusting step can be applied to the soluble vanadium salt solution before being added to ZnO suspension in the first step. The porous $VO_2$ nanostructures derived from ZnO nanoparticles are used as "seeds" for the formation of $VO_x$ nanostructures with part of $V^{4+}$ in the nanostructures transforming to $V^{5+}$ by a controlled oxidation step with the help of a $V^{5+}$ precursor. Some $V^{5+}$ can be also formed by direct deposition from the $V^{5+}$ precursor. The resulting $VO_x$ suspension is obtained as a mix of $V^{4+}$ and $V^{5+}$ nanostructure suspension. The $VO_x$ suspension is then centrifuged to remove the original solvent and the collected sediment is then re-dispersed in a neutral polar solvent. The $VO_x$ suspension in the neutral polar solvent is then further made into a thin film as a charge balancing thin film for an ECD by a thin film coating method. An optional second oxidation step can be applied at the end to further oxidize $V^{4+}$ to $V^{5+}$ to produce the $VO_x$ thin film with more $V^{5+}$ and greater electrochemical properties.

In some embodiments, example soluble vanadium salt includes $VOSO_4$ among others known in the art. The $V^{5+}$ precursor may be vanadium based organo-metallic compounds. Example $V^{5+}$ precursor includes oxytriisopropoxide, vanadium (V) oxytriethoxide and vanadium (V) oxytripropoxide, among others known in the art. Example neutral polar solvent for re-dispersion of $VO_x$ includes water, IPA, methanol, ethanol, butanol, acetonitrile, dimethylsulfoxide (DMSO), acetone, among others known in the art.

In some embodiments, the first oxidation step comprises hydrothermal synthesis, chemical oxidation and photonic curing. Example chemical oxidation reagents include $O_2$, $O_3$, peroxide, halogens, $KMnO_4$, $K_2Cr_2O_7$, and others.

In some embodiments, the example thin film coating method includes spin-coating, slot-die coating, spray coating, bar coating, among others known in the art.

In some embodiments, the optional second oxidation method used to further oxidize $V^{4+}$ to $V^{5+}$ includes thermal annealing, IR radiation, UV-ozone treatment, photonic curing, among others known in the art.

In one embodiment, $VOSO_4$ is dissolved in DI water and then swiftly injected into the suspension of ZnO nanoparticles in DI water with a weight ratio of 5:1 under sonication. The amorphous $VO_2$ nanostructure suspension is formed by depositing $VO_2$ onto a sacrificial ZnO template. To purify the $VO_2$ nanostructure suspension, the mixture is then centrifuged at 9,000 rpm for 3 min. The resulting $VO_2$ nanoparticle sediment is re-dispersed in DI water and centrifuged to remove the solvent, and then the resulting sediment is dispersed in 6 mL of DI water by sonication. The purified $VO_2$ nanoparticles dispersed in DI water is then added under sonication into 3 mL of IPA containing 50 μl of vanadium oxytriisopropoxide. After the addition, the mixture solution is transferred into a 50 mL Teflon-lined autoclave and placed into an oven. The temperature of the oven is brought up to 140° C. within 14 minutes, and kept at 140° C. for 1.5 hours. After cooling down, the product mixture solution is centrifuged at 9,000 rpm for 3 minutes and the resulting sediment is re-dispersed in IPA under sonication, and then centrifuged one more time to remove the supernatant and the sediment is re-dispersed in IPA again under sonication. The final concentration of $VO_x$ nanoparticles dispersed in IPA is about 2 mg/ml. 0.2 mL resulting $VO_x$ solution is spin coated onto a 20*30*0.7 mm ITO substrate at the speed of 1500 rpm for 30 seconds, and the spin coating process is repeated one or several more time. The counter electrode substrate is then transferred to a hot plate and kept heating at 150° C. for 1.5 hours and then being cooled down. UV-ozone is applied to the resulting thin film for 30 minutes to further oxidize $V^{4+}$ to $V^{5+}$.

In one embodiment, $VOSO_4$ is dissolved in DI water is swiftly injected into the suspension of ZnO nanoparticles in DI water with a weight ratio of 5:1 under sonication. The $VO_2$ nanostructure suspension is formed by depositing $VO_2$ onto a sacrificial ZnO template. pH is adjusted by 1M $H_2SO_4$ to pH=2 to ensure a monodispersed $VO_2$ nanoparticle suspension. To purify the $VO_2$ nanostructure suspension, the mixture is then centrifuged at 9,000 rpm for 3 min. The resulting $VO_2$ nanoparticle sediment is re-dispersed in DI water and centrifuged to remove the solvent, then the resulting sediment is dispersed in 6 mL of DI water by sonication. The purified $VO_2$ nanoparticles dispersed in DI water is then added under sonication into 3 mL of ethanol containing 50 μl of vanadium oxytriisopropoxide. After the addition, the mixture solution is transferred into a 50 mL Teflon-lined autoclave and placed into an oven. The temperature of the oven is brought up to 140° C. within 14 minutes, and kept at 140° C. for 1.5 hours. After cooling down, the product mixture solution is centrifuged at 9,000 rpm for 3 minutes and the resulting sediment is re-dispersed in ethanol under sonication, and then centrifuged one more time to remove the supernatant and the sediment is re-dispersed in IPA again under sonication. The final concentration of $VO_x$ nanoparticles dispersed in IPA is about 2 mg/ml. 0.1 mL resulting $VO_x$ solution is spin coated onto a 50*7*0.7 mm ITO substrate at the speed of 1500 rpm for 30 seconds, and the spin coating process is repeated one or several more time. The counter electrode substrate is then transferred to a hot plate and kept heating at 150° C. for 1.5 hours and then being cooled down.

In one embodiment, a $Li^+$ doped $VO_x$ thin film is made. 500 mg of $VOSO_4$ is dissolved in 10 mL DI water in a 20 mL vial. 100 mg of ZnO nanoparticles are dispersed in another 20 mL vial, where 60 mg of LiCl is dissolved. Under sonication, the $VOSO_4$ solution is swiftly added into the mixture of ZnO particles and LiCl. The mixture of the three is then centrifuged at 9,000 rpm for 3 min. The resulted sediment is re-dispersed in DI and centrifuged to remove the solvent, and then dispersed again in IPA to yield about 2 mg/mL $Li^+$ doped $VO_x$ IPA solution. 0.2 mL resulting $VO_x$ solution is spin coated onto a 20*30*0.7 mm ITO substrate at the speed of 1500 rpm for 30 seconds, and the spin coating process is repeated one more time. The counter electrode substrate is then transferred to a hot plate and kept heating at 150° C. for 1.5 hours and then being cooled down.

What is claimed is:

1. An electrochromic device, comprising a charge balancing thin film, the charge balancing thin film including a vanadium oxide with a formula of $VO_x$,
wherein:
x ranges from 2 to 2.5; and
a coloration efficiency of the charge balancing thin film is less than about 10 $cm^2 C^{-1}$; and a charge density of the charge balancing thin film is greater than about 1 $mC/cm^2$ at a maximum device working voltage.

2. The electrochromic device of claim 1, wherein the vanadium oxide has a porous nanostructure and is amorphous or a combination of amorphous and polycrystalline.

3. The electrochromic device of claim 1, wherein the charge balancing thin film operates in a minimally color changing mode.

4. The electrochromic device of claim 1, wherein the vanadium oxide is a doped $VO_x$ or a doped $VO_x$ hydrate.

5. The electrochromic device of claim 4, wherein the doped $VO_x$ comprises one or more metal cations of the second to fourth period transition metal on the periodic table.

6. The electrochromic device of claim 4, wherein the doped $VO_x$ comprises metal cations selected from one or more of $Nb^{5+}$, $Nb^{6+}$, $Mo^{5+}$, and $Mo^{6+}$.

7. The electrochromic device of claim 4, wherein the doped $VO_x$ comprises non-metal cations having a diameter of less than 0.826 nm.

8. The electrochromic device of claim 1, further comprising a working electrode containing an electrochromic conjugated polymer.

9. The electrochromic device of claim 1, further comprising a working electrode containing $WO_3$.

10. A method to provide a material for the charge balancing thin film of claim 1 to pair with a working electrode and obtain a low device voltage in the electrochromic device of claim 1, the method comprising providing the material that has an electroactive voltage in close proximity with an electroactive voltage from the working electrode.

11. A method for preparing the charge balancing thin film of the electrochromic device of claim 1, comprising:
preparing a suspension containing VO2 nanostructures by adding a soluble vanadium salt solution into a ZnO nanoparticle suspension to form a VO2 nanostructure suspension;
performing a first oxidation step to transform a portion of V4+ in the VO2 nanostructure suspension to V5+ with the presence of a V5+ precursor to form a VOx suspension;
centrifuging the VOx suspension to obtain a resulting sediment and re-dispersing the resulting sediment in a neutral polar solvent to form a VOx solution; and
preparing a VOx thin film by a coating method with the VOx solution.

12. The method of claim 11, wherein preparing the suspension containing $VO_2$ nanostructures comprises adding a dopant to the soluble vanadium salt solution.

13. The method of claim 11, further comprising adjusting a pH value of the soluble vanadium salt solution before being added to the ZnO nanoparticle suspension.

14. The method of claim 11, further comprising: performing, after the $VO_x$ thin film is formed, a second oxidation step to further oxidize $V^{4+}$ to $V^{5+}$.

15. The method of claim 11, further comprising preparing the soluble vanadium salt solution with soluble vanadium salts including $VOSO_4$.

16. The method of claim 11, wherein the $V^{5+}$ precursor comprises vanadium-based organo-metallic compounds including one or more of vanadium (V) oxytriisopropoxide (VOTP), vanadium (V) oxytriethoxide, and vanadium (V) oxytripropoxide.

17. The method of claim 11, wherein the first oxidization step comprises one of hydrothermal oxidation, chemical oxidation, or photonic curing.

18. The method of claim 11, wherein the neutral polar solvent for re-dispersion comprises one or more of water, isopropyl alcohol (IPA), methanol, ethanol, acetonitrile, dimethylsulfoxide (DMSO), t-butyl alcohol, and acetone.

19. The method of claim 14, wherein the second oxidation step comprises one of thermal annealing, UV-ozone, or photonic curing.

* * * * *